(12) United States Patent
Miho et al.

(10) Patent No.: US 6,405,410 B1
(45) Date of Patent: *Jun. 18, 2002

(54) RETRACTABLE ASSIST GRIP AND MOUNTING METHOD THEREOF

(75) Inventors: Sugumune Miho; Hozumi Noda, both of Hiroshima (JP)

(73) Assignee: Nishikawa Kasei Co., Ltd., Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/693,903

(22) Filed: Oct. 23, 2000

Related U.S. Application Data

(63) Continuation-in-part of application No. 09/438,583, filed on Nov. 12, 1999, now Pat. No. 6,223,395.

(30) Foreign Application Priority Data

| Jun. 17, 1999 | (JP) | 11-170454 |
| May 18, 2000 | (JP) | 2000-146413 |
| Jun. 26, 2000 | (JP) | 2000-190776 |

(51) Int. Cl.[7] .......................... A45C 13/22; A45C 13/26
(52) U.S. Cl. .................. 16/429; 16/445; 16/438
(58) Field of Search ........................ 16/429, 412, 438, 16/444, 445, 50, 54, 342, 82; 188/290; 296/214, 39.1

(56) References Cited

U.S. PATENT DOCUMENTS

| 4,694,530 A | * | 9/1987 | Foggini .......................... 16/82 |
| 4,842,106 A | * | 6/1989 | Ludwig ....................... 188/290 |
| 4,893,522 A | * | 1/1990 | Arakawa .................... 188/290 |
| 5,743,575 A | * | 4/1998 | McFarland .............. 16/DIG. 6 |
| 5,855,408 A | * | 1/1999 | Rickabus ..................... 16/438 |
| 5,920,957 A | * | 7/1999 | Wagner ........................ 16/438 |
| 6,048,125 A | * | 4/2000 | Droche et al. ................ 16/444 |

FOREIGN PATENT DOCUMENTS

| JP | 02-292480 | 12/1990 |
| JP | 03-121205 | 12/1991 |

(List continued on next page.)

OTHER PUBLICATIONS

Notice of Reasons of Rejection, Patent Application No. 2000-146413, Mailing date: Jun. 19, 2001.
Notice of Reasons of Rejection, Patent Application No. 2000-190776, Mailing date: Jun. 19, 2001.

*Primary Examiner*—Chuck Y. Mah
(74) *Attorney, Agent, or Firm*—Eric J. Robinson; Nixon Peabody LLP

(57) ABSTRACT

In a retractable assist grip in which a grip body rotatably supported on a mount is urged into swing motion from the use position to the retracted position, one side surface of a supporting part of the mount is formed integrally with s fulcrum pin extending therefrom. A pin support of a leg of the grip body is journaled on the fulcrum pin. On the other side surface of the supporting part, a recess and a loose-fit pin extending inside the recess from the bottom of the recess are formed coaxially with the fulcrum pin. The leg of the grip body is assembled against relative rotation with a spacer rotatably inserted into the recess and including a pin loose-fitting part for loosely receiving the loose-fit pin therein. A viscidity is provided between the outer periphery of the spacer and the inner periphery of the recess of the mount, thereby forming a damper. Further, a locking pin is retained prior to the mounting of the grip body to the mount. With the mount body engaged to the periphery of a mounting hole of an inner panel from the front side thereof, the locking pin is moved opposite to a direction of insertion thereof by the swing motion of the grip body to the use position so that an extension at the distal end of the locking pin is retained at a locking position, thereby holding flexible engaging pieces extending from the back of the mount body in engagement on the periphery of the mounting hole.

19 Claims, 33 Drawing Sheets

FOREIGN PATENT DOCUMENTS

| | | |
|---|---|---|
| JP | 04-282039 | 10/1992 |
| JP | 5-96982 | 4/1993 |
| JP | 06-028320 | 4/1994 |
| JP | 07-010341 | 2/1995 |
| JP | 07-083263 | 3/1995 |
| JP | 07-137566 | 5/1995 |
| JP | 07-236594 | 9/1995 |
| JP | 07-243429 | 9/1995 |
| JP | 07-301272 | 11/1995 |
| JP | 9-263166 | 10/1997 |
| JP | 10-24759 | 1/1998 |
| JP | 10-024759 | 1/1998 |

* cited by examiner

RETRACTABLE ASSIST GRIP AND MOUNTING METHOD THEREOF

This application is a Continuation-In-Part of application Ser. No. 09/438,538, filed Nov. 12, 1999, now U.S. Pat. No. 6,223,395.

FIELD OF THE INVENTION

This invention relates to a. retractable assist grip for a car body, which is retracted from its use position to its retracted position when it is not in use, and a mounting method thereof, and more particularly relates to pivotal type one which is retractable so as to be swung to its retracted position.

DESCRIPTION OF THE PRIOR ART

There is known a conventional retractable assist grip of such kind, for example, as disclosed in Japanese Patent Application Laid-Open Gazette No. 9-263166. In this case, respective pairs of extensions are provided on each leg of a U-shaped grip body and each corresponding part of a car body, and one pair of extensions, extending from one of the legs of the grip body or the corresponding part of the car body, are interposed between the other pair of extensions. In addition, coaxial holes are formed over the two pairs of extensions, and a damper, which is formed of an outer cylinder and an inner pin inserted into the outer cylinder and in which a high-viscosity viscidity is encapsulated, is inserted into the coaxial holes. And, the outer cylinder and the inner pin of the damper are fixed to the two pairs of extensions, one located on the grip body side and the other located on the car body side, respectively. Thus, when the grip body is swung from use to retracted position, it is urged against the swing motion by the viscosity of the viscidity in the damper thereby reducing its swinging speed.

When the swing motion of the grip body toward the retracted position is slowed down in the above manner, the grip body slowly moves from use to retracted position. Therefore, it is prevented that the grip body immediately moves to the retracted position and hits the car body hard to cause a beating sound. This provides a desired upscale image to the assist grip.

As another example of conventional pivotal type retractable assist grips, there is known an assist grip in which one leg of the grip body is supported to a bearing member through a support pin, as disclosed in Japanese Patent Application Laid-Open Gazette No. 5-96982. In this assist grip, the support pin is contacted with a frictional brake made of viscoelastic resin material. When the grip body is swung from use to retracted position, it is given sliding resistance by the frictional brake thereby reducing its swinging speed.

The former conventional example (Japanese patent Application Laid-Open Gazette No. 9-263166) can provide improved quality appearance and durability. However, in this example, since the damper formed of the outer cylinder and the inner pin is fitted as a pin into holes through the pairs of extensions of the grip body and the car body, the number of components forming the damper mechanism becomes increased, which invites a rise in cost.

On the other hand, in the latter conventional example (Japanese Patent Application Laid-Open Gazette No. 5-96982), it is necessary to provide, in the bearing member, a frictional brake for contacting the support pin therewith. This increases the number of components for the damping mechanism. In addition, since the swing motion of the grip body is damped by sliding resistance, this makes it difficult to give an upscale image to the swing motion and may cause a drop in durability due to friction.

Alternatively, there is a retractable assist grip easily and readily mountable to an inner panel of a car body, for example, as disclosed in U.S. Pat. No. 4,981,322. In this assist grip, a pair of mount bodies are each formed with a through hole and a pair of flexible engaging pieces each having a pawl at the distal end thereof are extended from the periphery of the through hole on the back of each mount body.

In mounting this assist grip to the inner panel, the mounts are presented to corresponding mounting holes of the inner panel, the pairs of flexible engaging pieces are inserted into the mounting holes, respectively and the mount bodies are caused to abut on the peripheries of the corresponding mounting holes of the inner panel from the front side of the inner panel. Then, locking pins are inserted into the through holes of the mound bodies from the front side of the inner panel, respectively, and in this state, the grip body is swung in its retracted direction to press the locking pins into the corresponding through holes of the mount bodies. Each of the pressed locking pins pushes the pair of flexible engaging pieces apart from each other so that the pawls of the flexible engaging pieces are engaged on the periphery of the mounting hole of the inner panel from the back side thereof. Thus, the inner panel is secured in sandwich relation between the mount bodies and the pawls.

Meanwhile, for retractable assist grips, the grip body and the mounts are separate parts. Therefore, if the grip body and the mounts are carried individually into a car body assembly line and then mounted to the inner panel, this increases the number of assembly man-hours in the car body assembly line. Accordingly, the grip body and the mounts are generally carried, into the car body assembly line, in a semi-assembled condition where, as in the above conventional case, the locking pins are inserted halfway into the corresponding through holes of the mount bodies.

However, when the locking pins are kept inserted halfway into the through holes of the mount bodies, some factor may cause the locking pin to be fully pressed into or dropped out of the through hole of the mount body before the mounts are carried in the car body assembly line.

Once the locking pin has been fully pressed into the through hole, the assist grip in this state is no longer mountable to the inner panel since both the pawls are pushed apart from each other beyond the aperture of the mounting hole. In this case, though the locking pin should be pulled out of the through hole, the pulling of the locking pin is an extremely difficult work since the locking pin is forcibly pressed into the through hole,.

On the other hand, if the locking pin has been dropped out of the through hole, it may be lost, which makes it impossible to assemble the assist grip to the car body in the car body assembly line. Such an event constitutes a serious impediment to a smooth flow of the car body assembly line and therefore should be absolutely avoided.

A first object of the present invention is to improve a damper mechanism of a pivotal type retractable assist grip that uses a damper in which a high-viscosity viscidity is encapsulated, and more specifically not only to slow down the swing motion of the assist grip to its retracted position by an excellent damping effect of the damper in which the viscidity is encapsulated but also to reduce the number of components of the assist grip thereby resulting in cost reduction.

A second object of the present invention is to avoid any impediment to the mounting of the assist grip to a fixed body such as a car body panel by preventing the locking pin from moving to its locking position before the carriage of the assist grip into the assembly line and from dropping out of the through hole of the mount body.

SUMMARY OF THE INVENTION

To achieve the first object, in the present invention, an assist grip is configured such that a damper, in which the above-mentioned high-viscosity viscidity is encapsulated, is incorporated together with a grip body and a mount.

Specifically, the present invention is directed to a retractable assist grip including: a pair of mounts fixed to a fixed body such as a car body; a grip body pivotally mounted for swing motion at legs thereof onto the mounts, respectively; and urging means, provided between at least one of the legs of the grip body and the corresponding mount, for urging the grip body into swing motion from its use position to its retracted position.

Further, at least one of the pair of mounts includes a fulcrum pin extended integrally from one side thereof, a recess formed coaxially with the fulcrum pin on the opposite side of the mount, and a loose-fit pin extended integrally from the inner bottom toward the opening of the recess and coaxially with the fulcrum pin. Furthermore, the leg of the grip body is formed with a pin support journaled on the fulcrum pin. In addition, the leg of the grip body is assembled against relative rotation with a spacer rotatably inserted into the recess of the mount and including a pin loose-fitting part for loosely receiving the loose-fit pin therein, and a viscidity is provided in a space between the outer periphery of the spacer and the inner periphery of the recess of the mount.

With this arrangement, when the grip body swings with respect to the mount having the fulcrum pin, the pin support in the leg of the grip body rotates about the fulcrum pin of the mount and the spacer assembled against relative rotation with the leg of the grip body rotates about the loose-fit pin within the recess of the mount. Since the viscidity is provided in the space between the inner periphery of the recess of the mount and the outer periphery of the spacer, a damper is formed by the mount and the spacer fitted on the grip body side. The viscosity of the viscidity in the damper produces resistance against the rotation of the spacer, so that the grip body can swing slowly. This provides an upscale image to the swing motion.

Further, since the grip body is supported to the mount having the fulcrum pin such that the pin support of the leg of the grip body is journaled on the fulcrum pin of the mount and the spacer fitted on the grip body side is inserted into the recess of the mount, the assist grip can be built up from the urging means, the grip body, the mount and the spacer only. Accordingly, the number of components of the assist grip is reduced than that of the conventional one, which achieves cost reduction. In addition, since the damper is accommodated in the grip body, the appearance of the assist grip can be improved.

The viscidity is preferably also provided in a space between the inner periphery of the pin loose-fitting part of the spacer and the outer periphery of the loose-fit pin of the mount. In this case, when the grip body swings with respect to the mount, resistance against the swing motion produces not only by the viscosity of the viscidity in the space between the inner periphery of the recess of the mount and the outer periphery of the spacer but also by the viscosity of the viscidity in the space between the inner periphery of the pin-loose-fitting part of the spacer and the outer periphery of the loose-fit pin. The increase in resistance against the swing motion resulting from the viscosity of both the parts further increases the damping effect. In addition, since the parts for giving resistance against the swing motion by the viscosity are disposed in two layers around the rotational axis, the axial length of the damper can be shortened correspondingly.

Alternatively, a retractable assist grip of the present invention may be arranged as follows: In the retractable assist grip directed in the above manner, at least one of the pair of mounts is formed of first and second mounts; a leg of the grip body is assembled into unitary rotation with a fulcrum pin supported to the first mount; the grip body is formed with a spacer fitting part formed of a concavity coaxial with the fulcrum pin, the fulcrum pin extending inside the spacer fitting part toward the opening thereof; the second mount includes a spacer part rotatably fitted into the spacer fitting part and provided with a recess for loosely receiving the fulcrum pin extending inside the spacer fitting part therein; and a viscidity is provided at least between the outer periphery of the spacer part of the second mount and the inner periphery of the spacer fitting part of the grip body.

With this arrangement, when the grip body swings, the fulcrum pin assembled into unitary rotation with the leg of the grip body rotates with respect to the first mount and the grip body rotates around the second mount the spacer part of which is inserted into the spacer fitting part. At the time, since the viscidity is provided between the outer periphery of the spacer part of the second mount and the inner periphery of the spacer fitting part of the grip body, a damper is formed between the spacer part of the second mount and the grip body. The viscosity of the viscidity in the damper produces resistance against the swing motion of the grip body thereby swinging the grip body slowly. This provides an upscale image to the swing motion.

In addition, since the grip body is supported to the two mounts through the fulcrum pin, the assist grip can be built up from the grip body, the fulcrum pin, the two mounts and the urging means only. This reduces the number of components of the assist grip, resulting in cost reduction. Also, since the damper is accommodated in the grip body, the appearance of the assist grip can be improved.

A sealing member may be provided in one of a portion of the inner periphery of the recess of the amount in the vicinity of the open end of the recess and a corresponding portion of the outer periphery of the spacer, and a sealing surface engaging against the sealing member may be provided in the other so that the engagement of the sealing member against the sealing surface seals from the outside at least the space between the outer periphery of the spacer and the inner periphery of the recess of the mount. In addition, the sealing member may be placed, when the spacer is inserted into the recess of the mount and the viscidity is filled with at least the space between the outer periphery of the spacer and the inner periphery of the recess of the mount while expelling air from the space, to form a seal with the sealing surface by engagement against the sealing surface with the air in the space substantially fully expelled.

The sealing member may be placed, when the spacer is fully inserted into the recess of the mount, on apportion the sealing surface closer to the opening of the recess than the center of the sealing surface in a direction of insertion of the sealing member.

With the above sealing structures, when the spacer is inserted into the recess of the mount and the viscidity is filled with at least the space between the outer periphery of the spacer and the inner periphery of the recess of the mount while expelling air from the space, the air in the space can be expelled as much as possible to fill the space with substantially the viscosity alone. This enhances the damping effect of the viscosity.

More specifically, when a seal is formed by engaging the sealing member against the sealing surface, the sealing member is generally placed on the center of the sealing surface. However, if the sealing member is placed on a portion of the sealing surface closer to the opening of the recess than the center of the sealing surface in a direction of insertion of the sealing member like the invention as claimed in claim 4, a seal formation of the sealing member is delayed in inserting the spacer into the recess of the mount and the air in the space can be correspondingly much expelled to fill the spaces with substantially the viscosity alone.

A first restriction may be extended on the outer periphery of the spacer so as to be opposed to and spaced a predetermined clearance apart from the inner periphery of the recess of the mount, a second restriction may be extended on the inner periphery of the recess of the mount so as to be opposed to and spaced a predetermined clearance apart from the outer periphery of the spacer, and the first and second restrictions may be placed at positions to allow the swing motion of the grip body between the use position and retracted position.

With this arrangement, when the grip body automatically swing from its use position to retracted position by the bias of the urging means, the viscosity located in a zone between the first restriction on the outer periphery of the spacer and the second restriction on the inner periphery of the recess of the mount is pressurized by both the restrictions. The viscosity in the zone flows while being squeezed through the clearance between the first restriction and the inner periphery of the recess of the mount and the clearance between the second restriction and the outer periphery of the spacer. The flow resistances of the viscosity enhance the damping effect to reduce the swinging speed of the grip body, which can further slowly swing the grip body.

A third restriction may be extended on the outer periphery of the loose-fit pin of the mount so as to be opposed to and spaced a predetermined clearance apart from the inner periphery of the pin loose-fitting part of the spacer, a fourth restriction may be extended on the inner periphery of the pin loose-fitting part of the spacer so as to be opposed to and spaced a predetermined clearance apart from the outer periphery of the loose-fit pin of the mount, and the third and fourth restrictions may be placed at positions to allow the swing motion of the grip body between the use and retracted positions.

With this arrangement, when the grip body automatically swing from its use position to retracted position by the bias of the urging means, the viscosity located in a zone between the fourth restriction on the inner periphery of the pin loose-fitting part of the spacer and the third restriction on the outer periphery of the loose fit pin of the mount is pressurized by both the restrictions. The viscosity in the zone flows while being squeezed through the clearance between the fourth restriction and the outer periphery of the loose fit pin of the mount and the clearance between the third restriction and the inner periphery of the pin loose-fitting part of the spacer. As a result, the damping effect of the viscosity is enhanced, which can further slowly swing the grip body.

A plurality of support flanges may be radially extended in circumferentially equally spaced relation on one of a bottom end portion of the inner periphery of the recess of the mount and the outer periphery of the distal end of the spacer so as to relatively slidably engage the other. With this structure, the distal end of the spacer can bear against the mount. This enhances the bearing property of the mount relative to the spacer or the grip body.

To attain the above-mentioned second object, in this invention, a locking pin is pushed in to a larger extent than required to temporarily disengage the coupling between the distal end of the locking pin from engaging pieces, and thereafter the distal end of the locking pin is retained at a locking position between the engaging pieces in cooperation with the swing motion of the grip body to the use position.

More specifically, the invention is directed to a retractable assist grip including an elongated grip body having legs at both lengthwise ends thereof and mounts to which the legs are mounted for swing motion, the grip body being swung between its use and retracted positions with the mounts fixed to a fixed body.

Further, the mount includes: amount body which is provided with a swing support section for supporting the legs for swing motion and abuts on the periphery of a mounting hole of the fixed body from the front side of the fixed body; a through hole passing through the mount body from front to back thereof; at least two engaging pieces which are extended from the periphery of the through hole on the back of the mount body and inserted into the mounting hole of fixed body to engage on the edge of the mounting hole; and a locking pin having an extension at the distal end thereof, the locking pin being inserted into the through hole from the front side of the mount body prior to the mounting of the grip body to the mount so that the extension passes a locking position between the engaging pieces while pushing the engaging pieces apart from each other, the locking pin being restrained against movement opposite to a direction of insertion thereof into the through hole by the distal ends of the engaging pieces narrowed in distance therebetween by the passage of the extension over the locking position so that the extension is retained at a position having passed over the locking position, the locking pin being moved backward opposite to the direction of insertion thereof by the swing motion of the grip body to the use position in a state that the mount body of the mount to which the grip body is mounted is caused to abut on the periphery of the mounting hole of the fixed body from the front side thereof, the back ward movement of the locking pin causing the extension to enter again between the engaging pieces and push the engaging pieces apart from each other so that the extension is retained at the locking position thereby holding the engaging pieces in engagement on the edge of the mounting hole.

With the above structure, when the locking pin is inserted into the through hole of the mount body and the extension at the distal end of the locking pin enters between the engaging pieces while pushing them apart from each other and then passes over the locking position, the engaging pieces are released from the pressing force of the extension to regain its original position of narrow distance. The locking pin is thereby restrained against movement opposite to the direction of insertion thereof so that the extension is retained at a position having passed over the locking position. Accordingly, it can be avoided that some factor may cause the locking pin to move to the locking position before the mounts are carried in the car body assembly line. And, it can be prevented that the locking pin may drop out of the through hole of the mount body, or may be lost.

Further, since the extension of the locking pin is retained at a position having passed over the locking position, the engaging pieces are free from the pressing force of the extension so that the distance between the engaging pieces are narrowed. This enables the engaging pieces to be smoothly inserted into the mounting hole of the fixed body.

Accordingly, lack of parts and a difficult pulling work of the locking pin in the locking position are eliminated. This avoids a serious impediment to a smooth flow of the car body assembly line. In addition, by simply swinging the grip body to the use position, the extension of the locking pin can automatically be inserted between the engaging pieces and the locking pin can be retained at the locking position with the engaging pieces engaged on the; edge of the mounting hole. Accordingly, the assist grip can be mounted to the fixed body in a single operation.

A movement assist piece may be extended from the root end of the locking pin, and a pusher may be provided at the bottom end of the leg of the grip body so as to abut on the movement assist piece and move the locking pin opposite to the direction of insertion thereof by the swing motion of the grip body to the use position. This provides a specific mechanism for moving the locking pin to the locking position.

The fixed body may be a car body panel.

Further, a mounting method of a retractable assist grip according to the present invention is directed to a method of mounting a retractable assist grip including an elongated grip body having legs at both lengthwise ends thereof and mounts to which the legs are mounted for swing motion, the grip body being swung between its use and retracted positions with the mounts fixed to a fixed body, and the method comprises the steps of: inserting a locking pin having an extension at the distal end thereof into a through hole of the mount body from the front side thereof so that the extension passes a locking position between at least two engaging pieces extended from the periphery of the through hole on the back of the mount body while pushing the engaging pieces apart from each other, and restraining the locking pin against movement opposite to a direction of insertion thereof into the through hole by the distal ends of the engaging pieces narrowed in distance therebetween by the passage of the extension over the locking position so that the extension is retained at a position having passed over the locking position; and after mounting the grip body to the mount, swinging the grip body to the use position with the mount body caused to abut on the periphery of the mounting hole of the fixed body from the front side thereof and moving the locking pin opposite to the direction of insertion thereof by the swing motion of the grip body to cause the extension to enter between the engaging pieces and push the engaging pieces apart from each other so that the extension is retained at the locking position thereby holding the engaging pieces in engagement on the edge of the mounting hole. According to this method, the assist grip can be mounted to the fixed body so as to exert the above-described effects of the invention.

Figure 1:
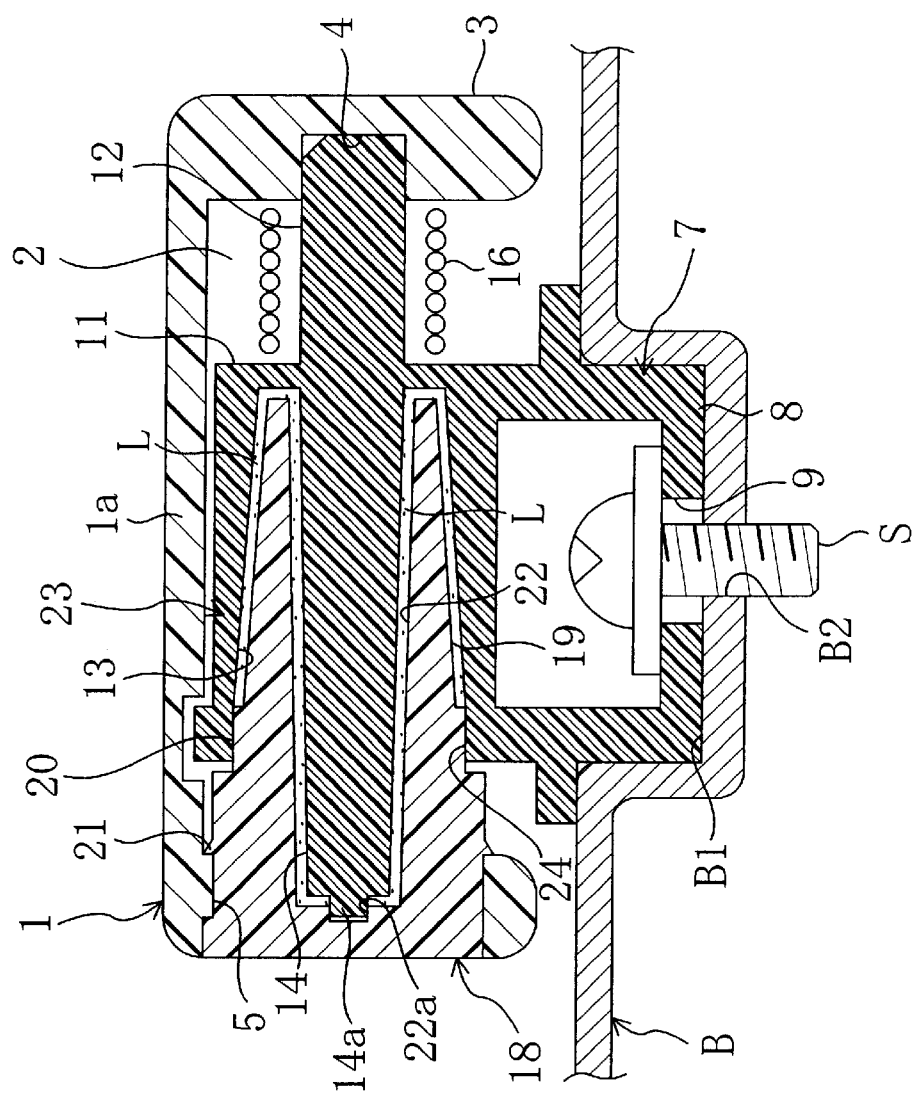
FIG. 1 is an enlarged cross-sectional view taken along the line I—I of FIG. 4.

DESCRIPTION OF THE PREFERRED EMBODIMENTS (Embodiment 1)

FIGS. 1 through 5 show a pivotal type retractable assist grip G according to Embodiment 1 of the present invention.

As shown in these figures, a grip body 1 is curved approximately in the shape of a bracket and is made of polypropylene (PP) for example. The grip body 1 has a pair of legs 1*a*, 1*a* at the lengthwise right and left ends (only the right-hand leg is shown in this embodiment), respectively, and is pivoted at the right-hand left-hand legs 1*a*, 1*a* to, for example, a car body (fixed body) B forming a vertical sidewall in a room of a vehicle. The pivoted structure thereof at the legs 1*a*, 1*a* allows the grip body 1 to swing between its use position and its retracted position. When the grip body 1, is in the retracted position, the intermediate part thereof directs upwardly to take a position approximately along the vertical plane. On the other hand, when the grip body 1 is in the use position, the intermediate part directs toward the car room to take a position approximately along the horizontal plane.

Specifically, in a state that the grip body 1 is in the retracted position, an accommodating section 2 is formed on the back of one of the legs, e.g., the right-hand leg 1*a* (or the left-hand leg 1*a*), (on the side opposed to the car body B) so as to be constituted by a cavity cut out in an approximately rectangular shape upwardly from the bottom surface of the grip body 1. Out of two laterally opposed sidewalls of the accommodating section 2, an outer sidewall located far from the lateral center of the grip body 1 (right-hand sidewall in FIG. 1) is formed into a pin support 3. A bottomed circular support bore 4 is formed in the inside surface of the pin support 3. On the other hand, an inner sidewall of the accommodating section 2, located closer to the lateral center of the grip body 1 (left-hand sidewall in FIG. 1), has a spacer fitting hole 5 having a half-round lower part and a rectangular upper part and formed through the inner sidewall such that the center of the half circle of the lower part is aligned with the center of the support bore 4.

Figure 2:
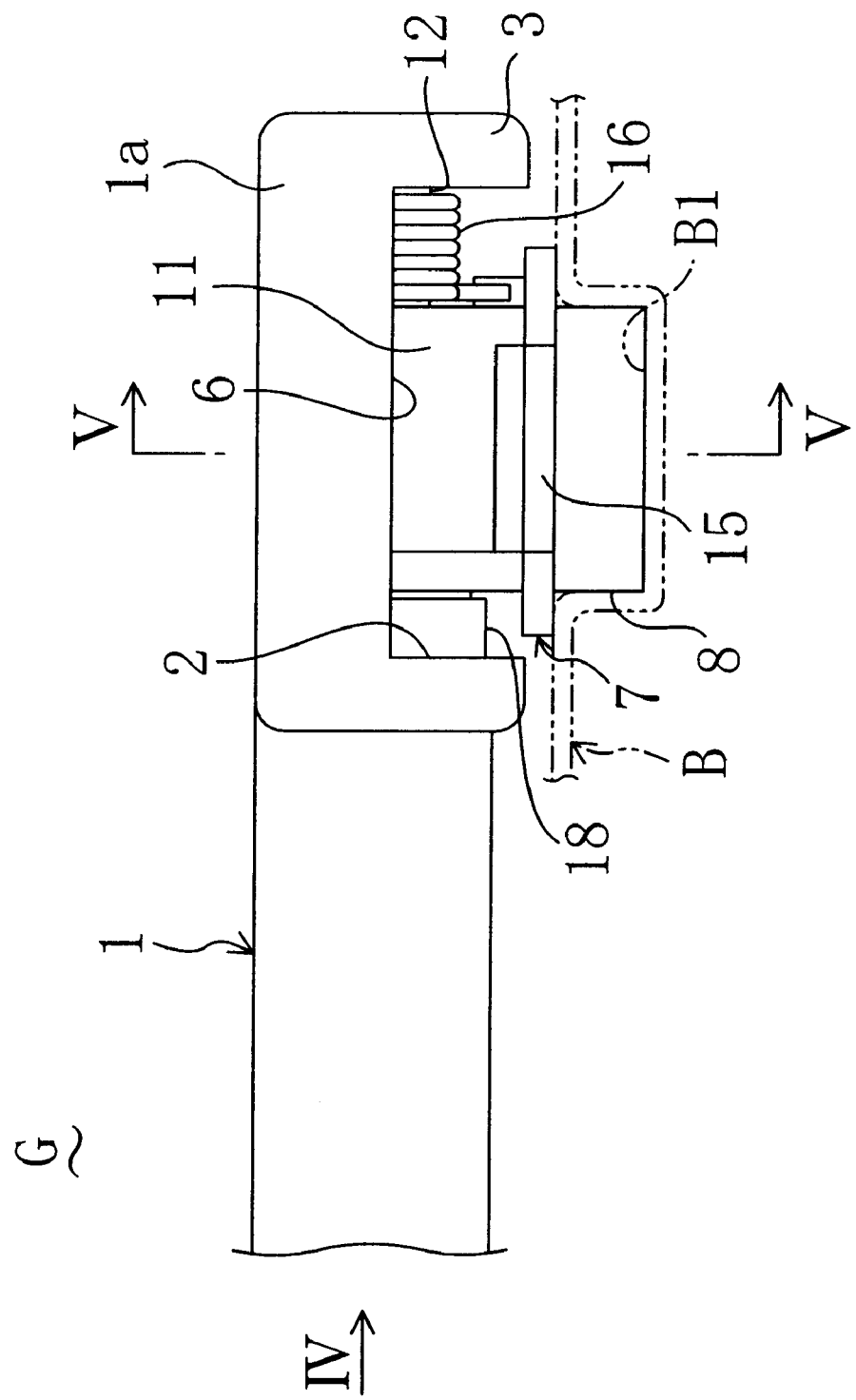
FIG. 2 is a plan view of an essential part of an assist grip according to Embodiment 1 of the present invention as seen from the bottom.
Figure 3:
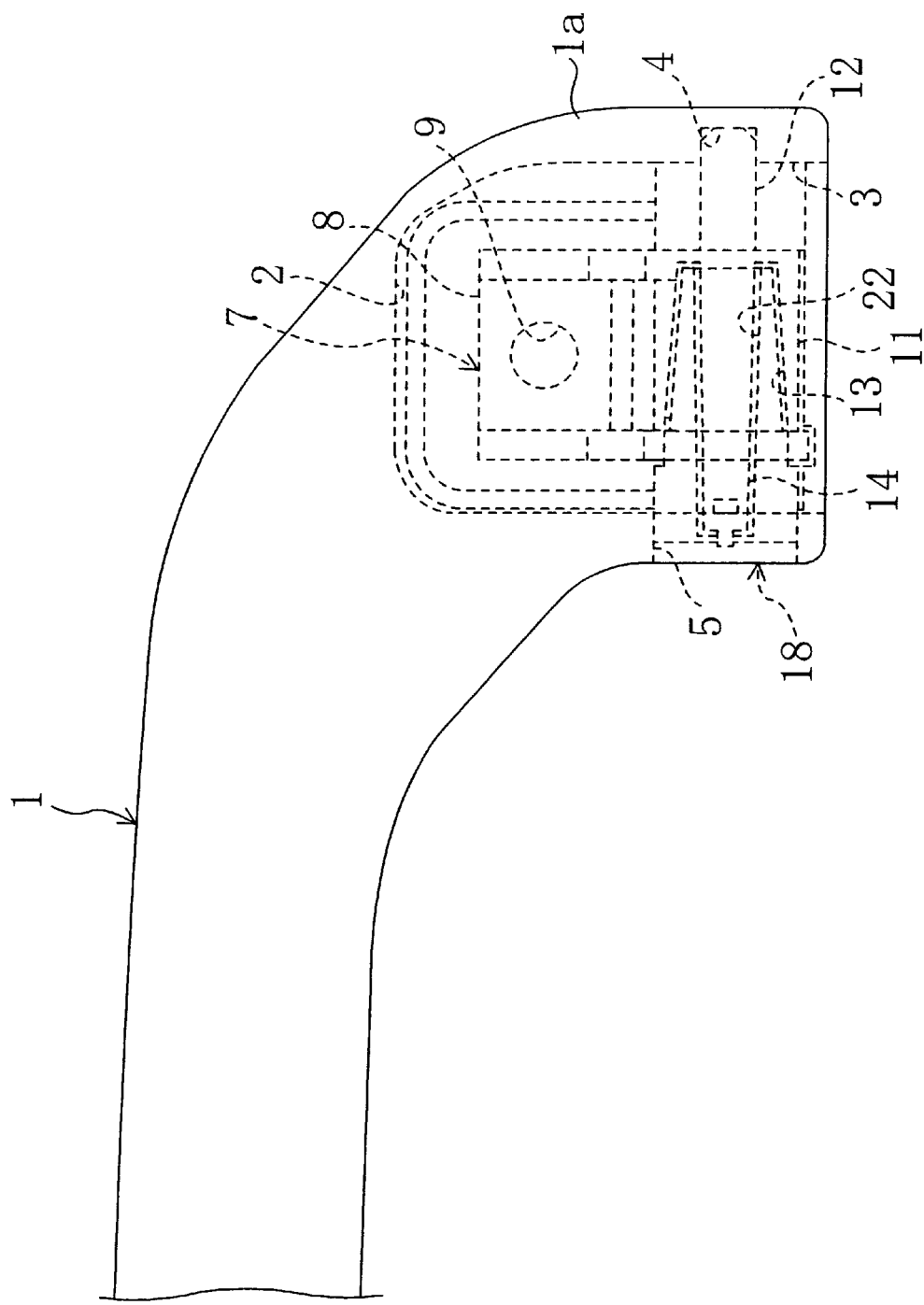
FIG. 3 is a front view of the essential part of the assist grip in FIG. 2.
Figure 4:
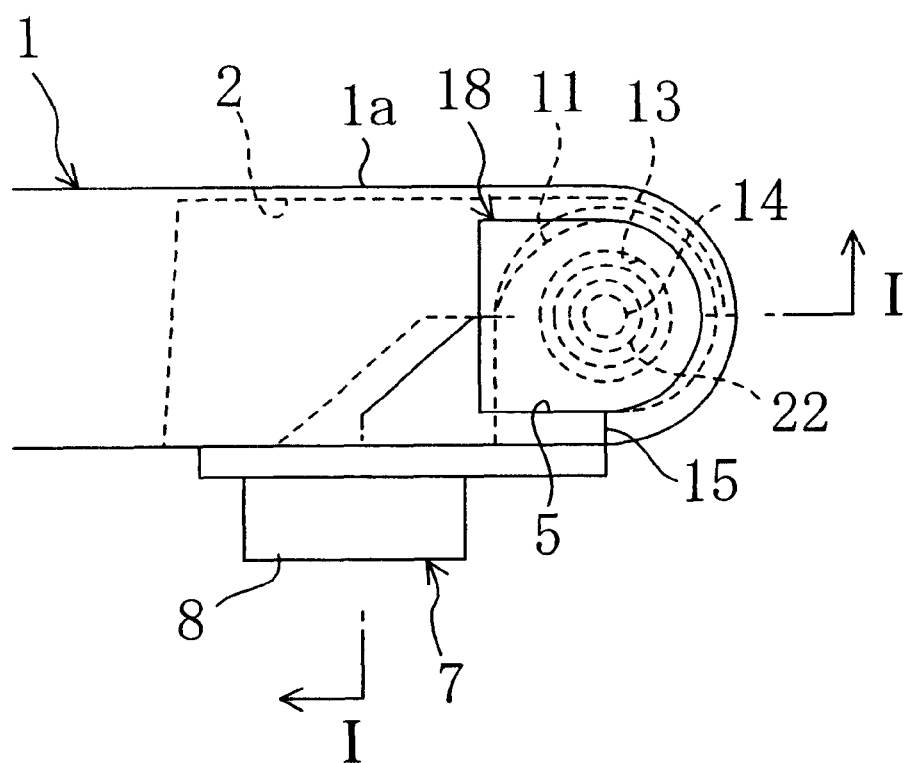
FIG. 4 is a view taken in the direction of the arrow IV of FIG. 2.
Figure 6:
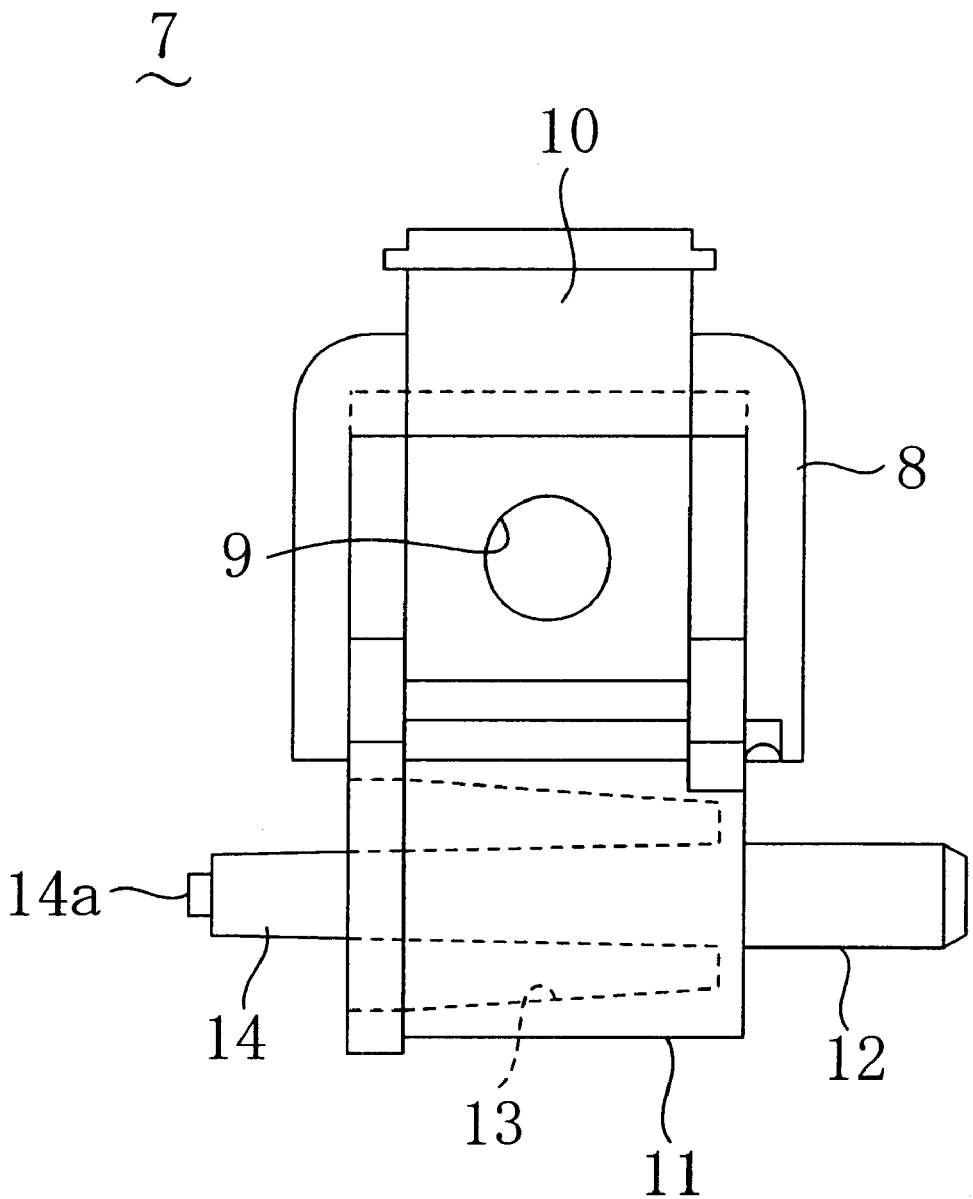
FIG. 6 is an enlarged front view of a mount.
Figure 7:
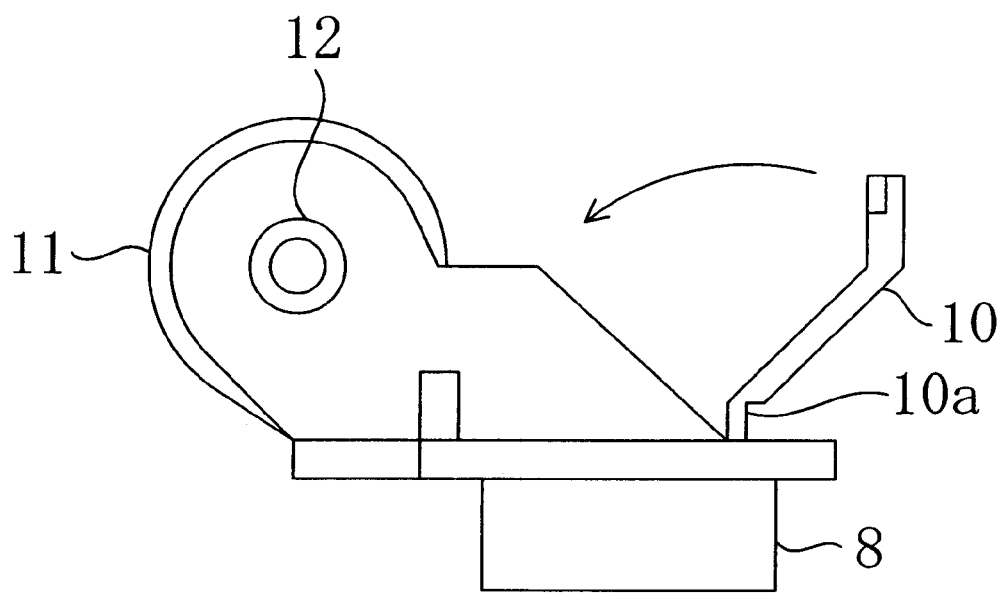
FIG. 7 is an enlarged side view of the mount.
Figure 8:
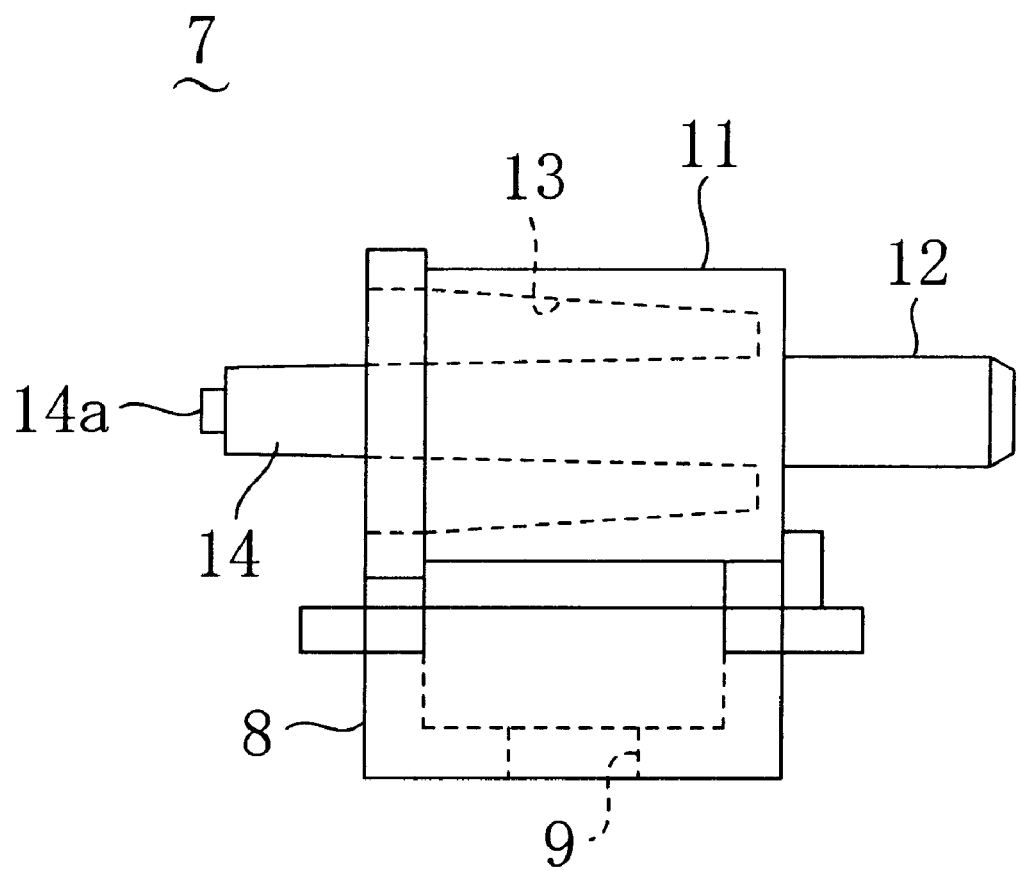
FIG. 8 is an enlarged plan view of the mount.

In the accommodating section 2 of the grip body 1, part of a mount 7, which is made of polyacetal (POM) or the like and secured to the car body B, is disposed and contained. As shown in FIG. 6 through 8, the mount 7 has a bottomed box-shaped fixing part 8 of rectangular section with a front aperture. The bottom of the fixing part 8 has a screw free-receiving hole 9 formed therethrough. As shown in FIGS. 1 and 2, the mount 7 is fixed to the car body B by fitting the bottom of the fixing part 8 of the mount 7 into a rectangular mounting recess B1 formed in the car body B and threading a screw S, having passed through the screw free-receiving hole 9 at the bottom of the fixing part 8, into a screw hole B2 formed at the bottom of the mounting recess B1. An upper edge of the aperture of the fixing part 8 is provided integrally with a hinged type cover 10 for opening and closing the aperture. The above-mentioned threading work using the screw S is made with the cover 10 open, and thereafter, the cover 10 is closed to cover the aperture of the fixing part 8 thereby hiding the screw S.

At the front side of the fixing part 8 of the mount 7, a supporting part 11 is integrally formed so as to be offset below from the fixing part 8 (on the side opposite to a hinged part 10*a* of the cover 10). Out of laterally opposite side surfaces of the supporting part 11, one side surface facing the pin support 3 of the grip body 1 is formed integrally with a fulcrum pin 12 extending from the one side surface. On the other side surface of the supporting part 11, a recess 13, formed of a tapered hole diminishing its inner diameter toward the fulcrum pin 12 (toward its bottom), is formed coaxially with the fulcrum pin 12. A tapered loose-fit pin 14 is extended integrally from the bottom of the recess 13 and coaxially with the fulcrum pin 12 to pass the inside of the recess 13 toward the opening thereof. The root end of the tapered loose-fit pin 14 has a diameter substantially equal to that of the fulcrum pin 12. The loose-fit pin 14 extends beyond the opening of the recess 13, and the distal end portion thereof is extended and formed integrally into a small-diameter pivot pin 14*a* forming a level difference with the remaining portion of the loose-fit pin 14.

As shown in FIG. 1, the distal end portion of the fulcrum pin 12 of the mount 7 is rotatably inserted into the support bore 4 of the pin support 3 in the right-hand leg 1*a* of the grip body 1. Under this configuration, the grip body 1 is supported at the pin support 3 of the right-hand leg 1*a* for swing motion on the fulcrum pin 12 of the mount 7.

A torsion coil spring 16 as an urging means is disposed around the fulcrum pin 12 of the mount 7. The spring 16 is anchored at one end thereof on the pin support 3 of the grip body 1 and at the other end on the fixing part 8 of the mount 7. The grip body 1 is urged into swing motion from the use position toward the retracted position by the torque of the spring 16.

Figure 9:
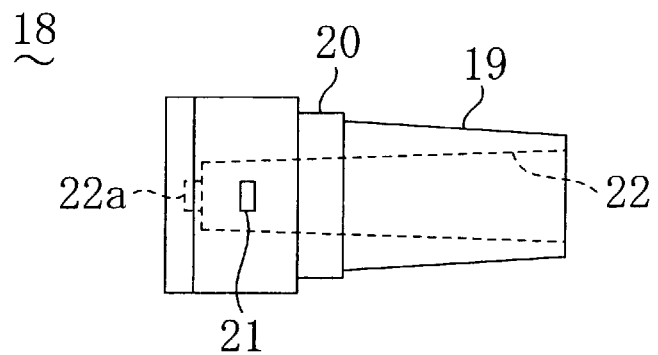
FIG. 9 is an enlarged front view of a spacer.
Figure 10:
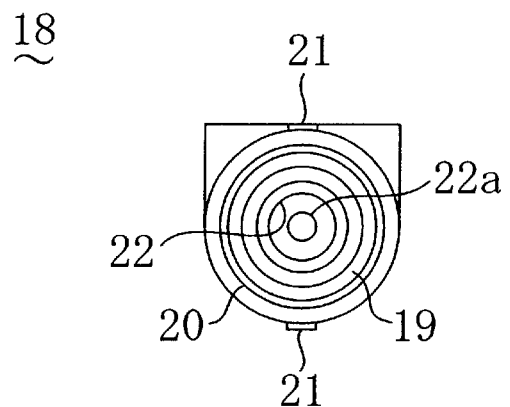
FIG. 10 is an enlarged side view of the spacer.
Figure 11:
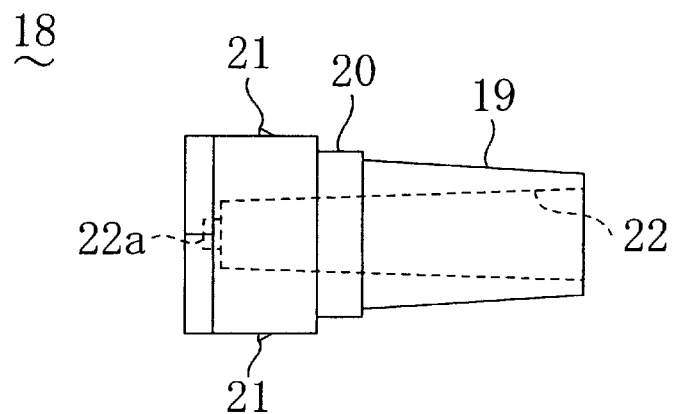
FIG. 11 is an enlarged plan view of the spacer.

A bottomed spacer 18 in substantially cylindrical form is fixedly mounted against rotation in the spacer fitting hole of the right-hand leg 1*a* of the grip body 1. The end portion of the spacer 18 is inserted rotatably in the recess 13 of the mount 7. In detail, as shown in FIGS. 9 through 11, the end portion of the spacer 18 is composed of a tapered insert part 19 and a sealing part 20 of larger diameter extending radially outwardly from the root end of the insert part 19 to form a level difference therebetween. As shown in FIG. 1, when the insert part 19 is inserted into, the recess 13 of the mount 7, a tapered cylindrical space of substantially uniform clearance is defined between the outer periphery of the insert part 19 and the inner periphery of the recess 13. This space between the outer periphery of the insert part 19 and the inner periphery of the recess 13 is provided by previously diminishing the diameter of the outer periphery of the insert part 19 in a manner of radially inwardly cutting it, to form a level difference thereon. Alternatively, the space may be provided by previously increasing the diameter of the inner periphery of the recess 13 in a manner of radially outwardly cutting it to form a level difference thereon. In the vicinity of the open end of the recess 13 of the mount 7, a sealing surface 24 is formed of a cylindrical surface parallel with the axis of the recess 13. The sealing part 20 of the spacer 18 can be fitted into the recess 13 at the sealing surface 24 in liquid-tight manner by engagement with the sealing surface 24. Through the engagement with the sealing surface 24, the sealing part 20 closes the open end of the recess 13 so as to allow rotation relative to the sealing surface 24, and seals the space between the outer periphery of the insert part 19 and the inner periphery of the recess 13 and a space between the inner periphery of the hereinafter described pin loose-fitting part 22 and the outer periphery of the loose-fit pin 14 of the mount 7.

The root end portion of the spacer 18 has the same contour (half-round at one end and rectangular at the other end) as that of the spacer fitting hole .5 of the right-hand leg 1*a* of the grip body 1. The fitting of the root end portion into the spacer fitting hole 5 holds the spacer 18 against rotation in the spacer fitting hole 5. A pair of clicks 21, 21 protrudes from diametrically opposite positions on the outer periphery of the root end portion of the spacer 18. On inserting the spacer 18 into the spacer fitting hole 5, the clicks 21 are engaged with the inside surface of the right-hand leg 1*a* of the grip body 1 so that the spacer 18 is securely held against movement off from the spacer fitting hole 5.

The spacer 18 is internally formed with the pin loose-fitting part 22 tapered and formed of a bottomed hole extending from the distal end thereof. A bore 22a is formed coaxially at the bottom of the pin loose-fitting part 22. As shown in FIG. 1, the loose-fit pin 14 of the mount 7 is loosely fitted into the pin loose-fitting part 22 so as to allow relative rotation of the spacer 18, and the pivot pin 14a of the loose-fit pin 14 is fitted into the bore 22a. In these fitting conditions, a tapered cylindrical space of substantially uniform clearance is defined between the outer periphery of the loose-fit pin 14 and the inner periphery of the pin loose-fitting part 22.

The space between the outer periphery of the insert part 19 of the spacer 18 and the inner periphery of the recess 13 is communicated with the space between the outer periphery of the loose-fit pin 14 of the mount 7 and the inner periphery of the pin loose-fitting part 22 of the spacer 18. A viscidity L made of a liquid such as a silicon of high viscosity (preferably, 100,000 cps or more) is filled in and lies between both the spaces. The recess 13 and the loose-fit pin 14 of the mount 7, the insert part 19 and the pin loose-fitting part 22 of the spacer 18, and the viscidity L in the spaces form a damper 23 for generating torque providing resistance to swing motion of the grip body 1.

The load acting on the grip. body 1 of the assist grip G in passenger's use is distributed into three parts, i.e., the fulcrum pin 12 of the mount 7 fitted in the pin support 3 of the grip body 1, the open end portion (sealing surface 24) of the recess 13 of the mount 7 fitted on the sealing part 20 of the spacer 18 and the pivot pin 14a of the mount 7 fitted in the bore 22a of the spacer 18, and is then transmitted to the mount 7. This prevents breakage of the pin support 3 of the grip body 1 and the mount 7 and so on due to a concentrated load.

Alternatively, the load acting on the grip body 1 may not necessarily be distributed into the above-mentioned three parts in the mount 7, and may be distributed into two parts, i.e., the fulcrum pin 12 and the pivot pin 14a of the mount 7, or the fulcrum pin 12 and the open end portion of the mount 7.

Figure 5:
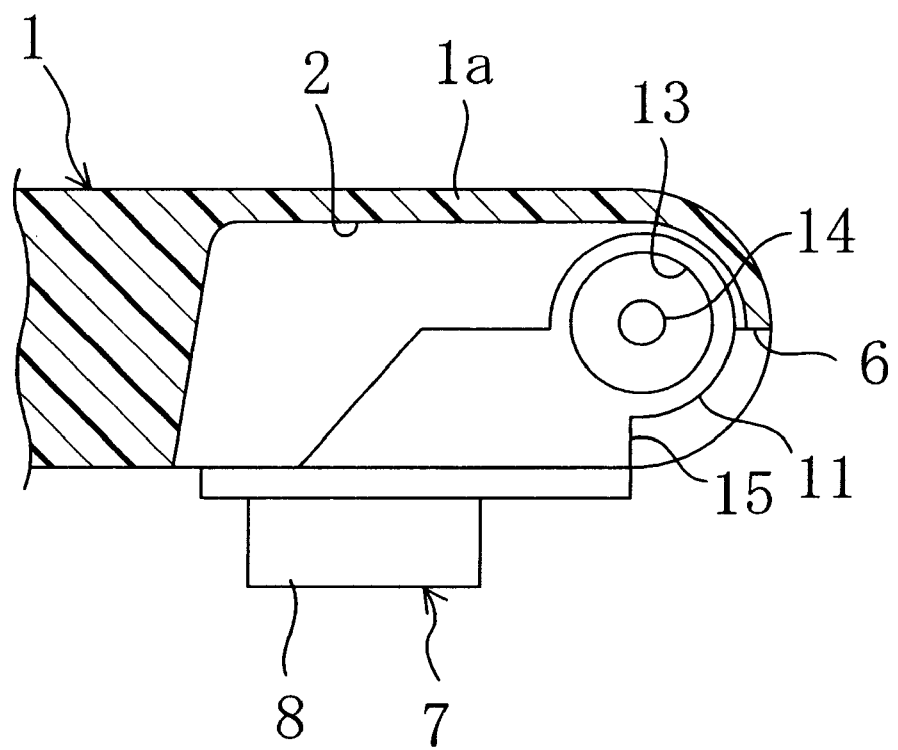
FIG. 5 is a cross-sectional view taken along the line V—V of FIG. 2.

As shown in FIG. 5, an abutment portion 6 is formed at the lower end of the opening of the accommodating section 2 in the right-hand leg 1a of the, grip body 1, and the fixing part 8 of the mount 7 is formed with a stop 15 abuttable on the abutment portion 6. On swinging the grip body 1 from retracted to use position, the abutment portion 6 abuts on the stop 15 of the fixing part 8 of the mount 7 so that the grip body 1 is constrained to stop at the use position.

The left-hand leg 1a as the other leg of the grip body 1 is provided with neither spring 16 nor damper 23 as in the right-hand leg 1a, though it is not shown. The left-hand leg 1a is supported for swing motion through a fulcrum pin alone to a mount fixed to the car body B (wherein the mechanism of fixing this mount to the car body B uses a screw like the fixing of the mount 7 for mounting the right-hand leg 1a on the car body B). Specifically, this mechanism is the same as that a torsion coil spring 16, a spring abutment 7a and a spring anchor lug 59 are removed from the mechanism shown in FIG. 24 in Embodiment 4 described later.

In assembling the assist grip G of this embodiment with the car body B, for the right-hand leg 1a of the grip body 1, the torsion coil spring 16 is first disposed around the fulcrum pin 12. Then, both ends of the torsion coil spring 16 are anchored on the grip body 1 and the mount 7, respectively, while the end of the fulcrum pin 12 is inserted into the support bore 4 of the pin support 3 of the grip body 1. Subsequently, the spacer 18 is inserted into and fixed to the spacer fitting hole of the right-hand leg 1a of the grip body 1 in a manner of inserting the insert part 19 thereof into the recess 13 of the mount 7 while loosely fitting the loose-fit pin 14 of the mount 7 into the pin loose-fitting part 22. Further, prior to the assembly of the spacer 18, a desired amount of viscidity L is filled into both the recess 13 of the mount 7 and the pin loose-fitting part 22 of the spacer 18. This allows the viscidity L to be encapsulated in the respective spaces defined between the outer periphery of the insert part 19 of the spacer 18 and the inner periphery of the recess 13 and between the inner periphery of the pin loose-fitting part 22 of the spacer 18 and the outer periphery of the loose-fit pin 14 of the mount 7, concurrently with the assembly of the spacer 18.

The assist grip G, having been assembled with the mount 7 in the above manner, is assembled to the car body B by passing a screw S through the screw free-receiving hole 9 of the fixing part 8 of the mount 7 and fastening the mount 7 to the car body B through the screw S. Thereafter, the hinged type cover 10 is closed to cover the aperture of the fixing part 8 thereby hiding the screw S.

Accordingly, in the assist grip G of this embodiment, the grip body 1 is normally urged into swing motion to the retracted position and held in this position by a bias of the torsion coil spring 16. Then, when the passenger uses the assist grip G, he can grasp the grip body 1 and swing it to the use position against the bias of the torsion coil spring 16 present in the right-hand leg 1a. Further, when the passenger stops the use of the assist grip G, if he simply releases the grip body 1, the grip body 1 automatically returns from use to retracted position while being swung by the bias of the torsion coil spring 16.

During the swing motion of the grip body 1 from use to retracted position (and also during the swing motion thereof from retracted to use position), the pin support 3 of the right-hand leg 1a of the grip body 1 rotates around the fulcrum pin 12 of the mount 7, and the spacer 18, mounted against rotation in the right-hand leg 1a of the grip body 1, rotates in the recess 13 of the mount 7. At the time, since the viscidity L lies in the space between the inner periphery of the recess 13 of the mount 7 and the outer periphery of the insert part 19 of the spacer 18, the viscosity of the viscidity L provides resistance (torque) to the rotation of the spacer 18 and the grip body 1. In addition, since the viscidity L also lies in the space between the inner periphery of the pin loose-fitting part 22 of the spacer 18 and the outer periphery of the loose-fit pin 14 of the mount 7, the viscosity of the viscidity L in this space also provides resistance to rotation. Such resistance at these locations causes the grip body 1 to swing slowly from use to retracted position. As a result, it is prevented that the grip body 1 hits the car body B hard to cause a beating sound. And, such slow swing motion provides an upscale image to the assist grip G.

Further, since the damper 23 is formed by filling the viscidity L into both the spaces between the inner periphery of the recess 13 of the mount 7 and the outer periphery of the insert part 19 of the spacer 18 and between the inner periphery of the pin loose-fitting part 22 of the spacer 18 and the outer periphery of the loose-fit pin 14, part of the damper 23 which provides rotational resistance is constructed in two layers of different diameters around the axis of rotation. Accordingly, the axial length of the damper 23 can be shortened as compared with a damper having part constructed in a single layer for providing rotational resistance.

Furthermore, the grip body 1 is supported to the mount 7 in such a manner that the pin support 3 of the right-hand leg 1a is journaled on the fulcrum pin 12 of the mount 7 and the spacer 18 is inserted into the recess 13 of the mount 7.

Therefore, the assist grip G is built up from the grip body 1, the mount 7, the torsion coil spring 16 and the spacer 18 only. Accordingly, the number of components of the assist grip G can be reduced, resulting in cost reduction.

In addition, since the damper 23 is accommodated in the grip body 1, the appearance of the assist grip G can be improved.

In this embodiment, the torsion coil spring 16 and the damper 23 are provided only in one leg (right-hand leg) 1a of the grip body 1. However, they may be provided in both the right-hand left-hand legs 1a, 1a.

(Embodiment 2)

FIGS. 12 through 19 show Embodiment 2 of the invention. It is to be noted that in each of embodiments described hereinafter, same components as those shown in FIGS. 1 through 11 are indicated by like reference characters and detailed description thereof will be omitted.

In this embodiment, the right-hand leg (or left-hand leg) 1a as one of the legs of the grip body 1 in the retracted position is formed with an upper accommodating section 31, a lower accommodating section 32 located below the upper accommodating section 31 and far from the lateral center of the grip body 1, and a spacer fitting part 5 located below the upper accommodating section 31 and closer to the lateral center of the grip body 1. The lower accommodating section 32 and the spacer fitting part 5 are separated one from the other by a partition 33. The upper and lower accommodating sections 31, 32 are cavities formed by recessing the back face of the right-hand leg 1a. The spacer fitting part 5 is a circular hole formed by recessing the side surface of the right-hand leg 1a closer to the lateral center of the grip body 1 and tapering the recessed surface. The bottom of the spacer fitting part 5 is formed of the above-mentioned partition 33. The outer sidewall of the lower accommodating section 32 is formed into the pin support 3. The pin support 3 is formed at the inside surface with a bottomed support bore 4 of rectangular cross section coaxially with the spacer fitting part 5. The partition 33 has a pin tight-fitting hole 34 formed therethrough coaxially with the spacer fitting part 5.

Figure 12:
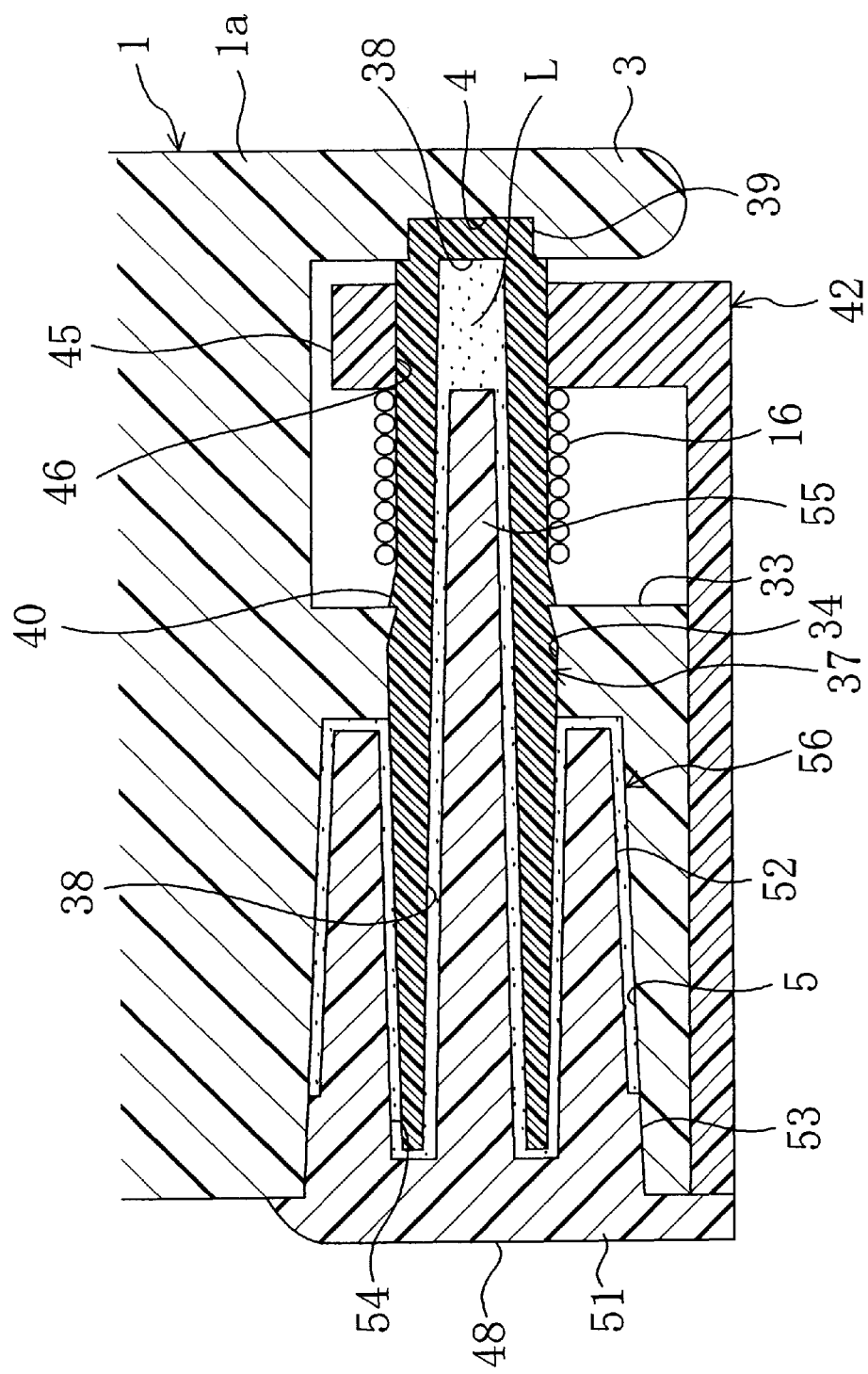
FIG. 12 is an enlarged cross-sectional view taken along the line XII—XII of FIG. 13.
Figure 13:
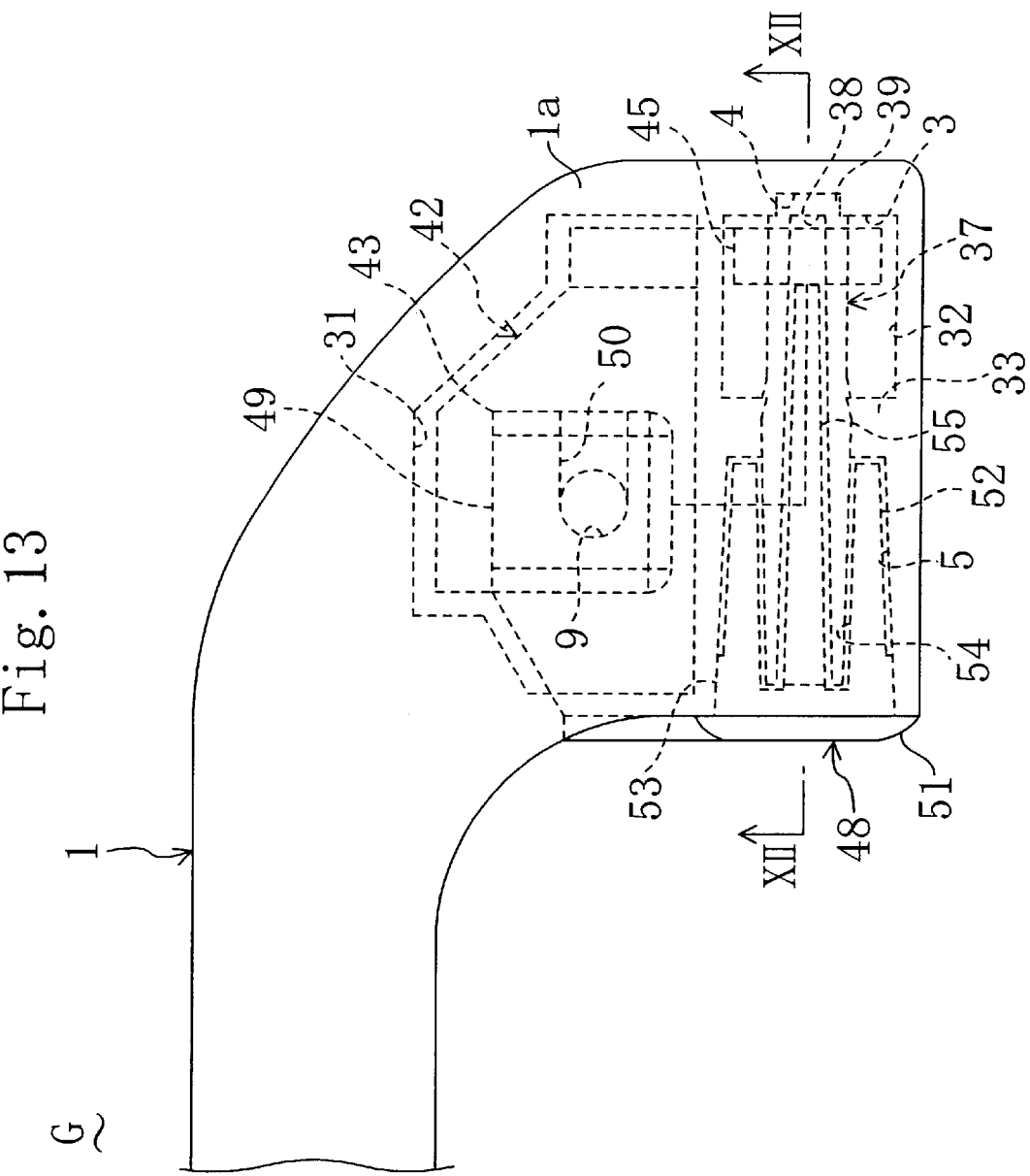
FIG. 13 is a diagram corresponding to FIG. 3, which shows an assist grip of Embodiment 2 of the present invention.
Figure 14:
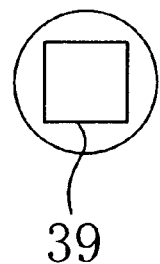
FIG. 14 is an enlarged side view of a fulcrum pin.
Figure 15:
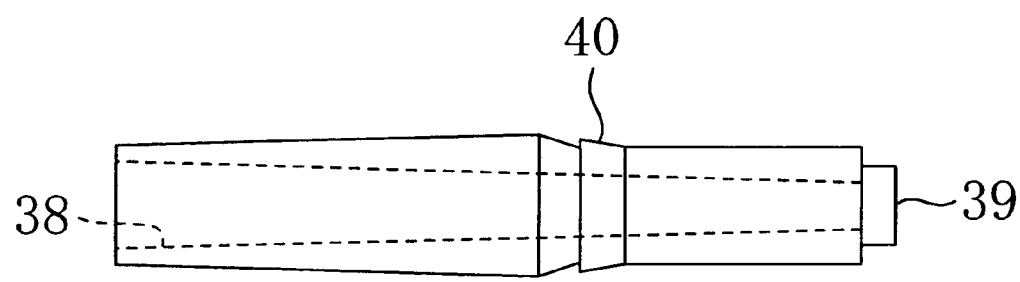
FIG. 15 is an enlarged front view of the fulcrum pin.

In order to pivotally mount the right-hand leg 1a of the grip body 1 on the car body B, a fulcrum pin 37 and first and second mounts 42, 48 are provided. As shown in FIGS. 14 and 15, the fulcrum pin 37 has a substantially cylindrical profile, and the outer periphery of the distal end portion thereof on the spacer fitting part 5 side is tapered toward the distal end. And, the fulcrum pin 37 has a bottomed axial hollow 38 opening into the distal end surface and tapered toward the root end of the fulcrum pin 37. On the other hand, the root end of the fulcrum pin 37 is formed integrally with a tight-fit part 39 of rectangular cross section, and the outer periphery thereof has a flange-shaped stop 40 extended therefrom. Further, as shown in FIG. 12, the tight-fit part 39 of the fulcrum pin 37 is tightly fitted against rotation into the support bore 4 of the pin support 3 of the grip body 1. The intermediate portion of the fulcrum pin 37 is fitted into the pin tight-fitting hole 34 in the partition 33 of the grip body 1 in liquid-tight manner, and the flange-shaped stop 40 on the outer periphery of the fulcrum pin 37 is engaged on the side surface of the partition 33 of the grip body 1. In this manner, the fulcrum pin 37 is fixedly assembled to the grip body 1 for unitary rotation and against axial movement. The spacer fitting part 5 of the grip body 1 is formed coaxially with the fulcrum pin 37, and the distal end portion of the fulcrum pin 37 extends to pass the inside of the spacer fitting part 5 toward its opening.

Figure 16:
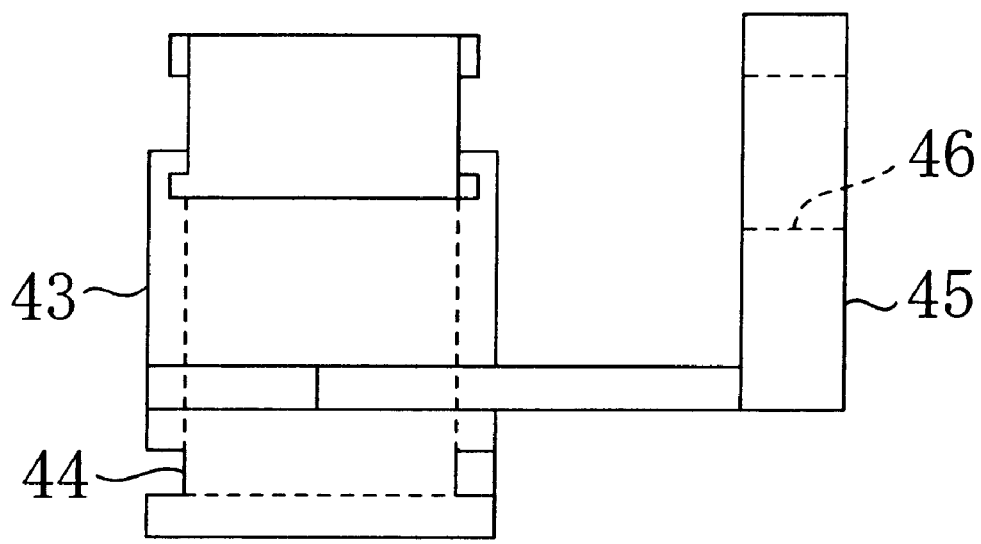
FIG. 16 is an enlarged plan view of a first mount.
Figure 17:
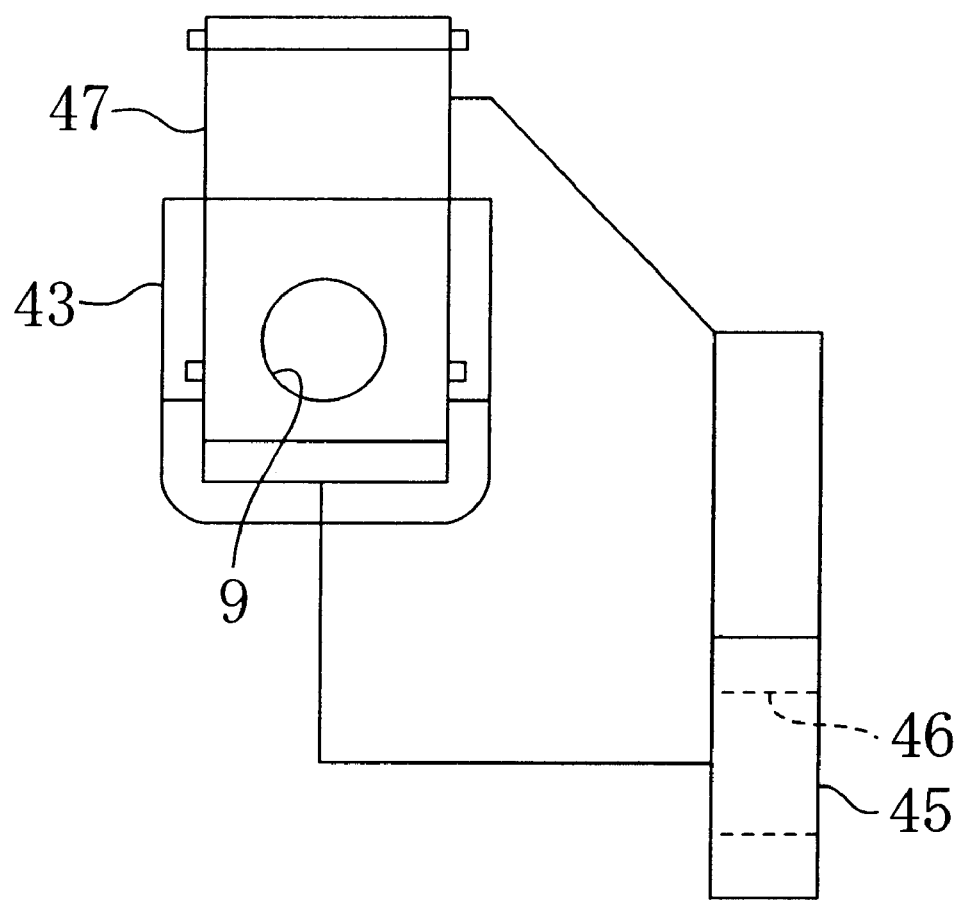
FIG. 17 is an enlarged front view of the first mount.

As shown in FIGS. 16 and 17, the first mount 42 has a fixing part 43 disposed and accommodated in the upper accommodating section 31 of the grip body 1. The fixing part 43 is provided with: a screw free-receiving hole 9 for freely receiving a screw (not shown) for fastening the first mount 42 to the car body B; and a hollow engaging part 44 of rectangular cross section, laterally formed through the fixing part 43, for engaging the hereinafter described fixing part 49 (see FIGS. 13, 18 and 19) of the second mount 48.

At the front side of the fixing part 43, a bearing part 45 is integrally formed which extends rightwardly downward from the fixing part 43 to be disposed and accommodated in the lower accommodating section 32 of the grip body 1. The bearing part 45 has a pin loose-fitting hole 46 formed therethrough. Under this configuration, as shown in FIG. 12, the bearing part 45 of the first mount 42 is disposed in the lower accommodating section 32 of the grip body 1, and the fulcrum pin 37 is rotatably inserted into the pin loose-fitting hole 46 of the bearing part 45. In this manner, the grip body 1 is supported to the first mount 42, fixedly mounted on the car body B, for swing motion through the fulcrum pin 37.

Further, as shown in FIG. 12, a torsion coil spring 16 is carried about the fulcrum pin 37 between the partition 33 of the grip body 1 and the bearing part 45 of the first mount 42. Both ends of the spring 16 are anchored to the bearing part 45 and the partition 33, respectively. Under this configuration, the spring bias force of the torsion coil spring 16 urges the grip body 1 from use to retracted position.

Figure 18:
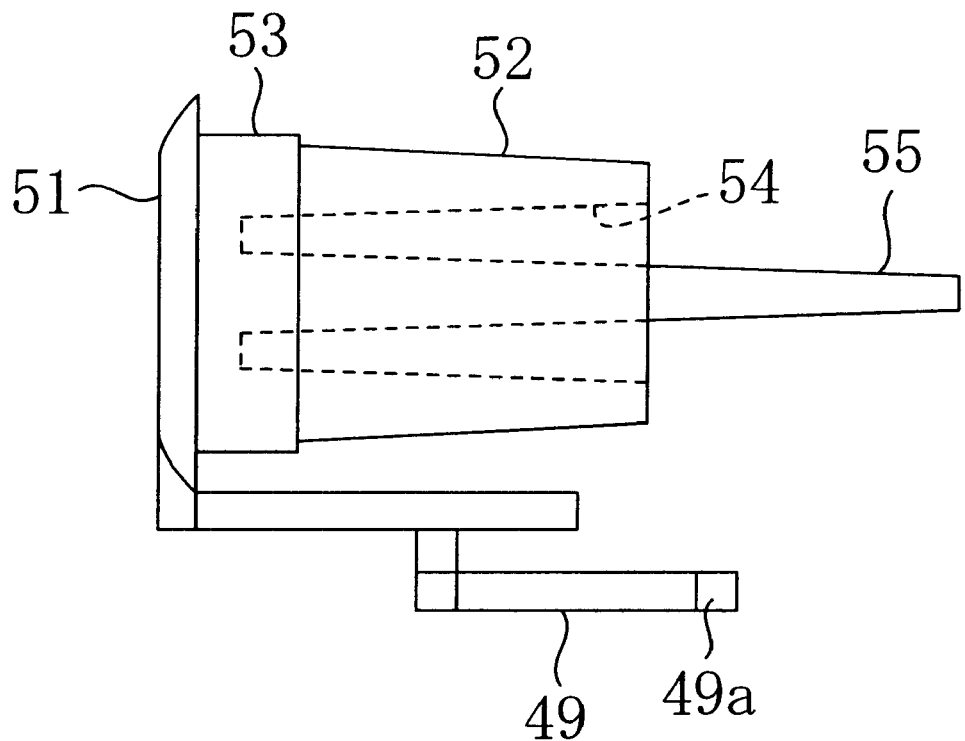
FIG. 18 is an enlarged plan view of a second mount.
Figure 19:
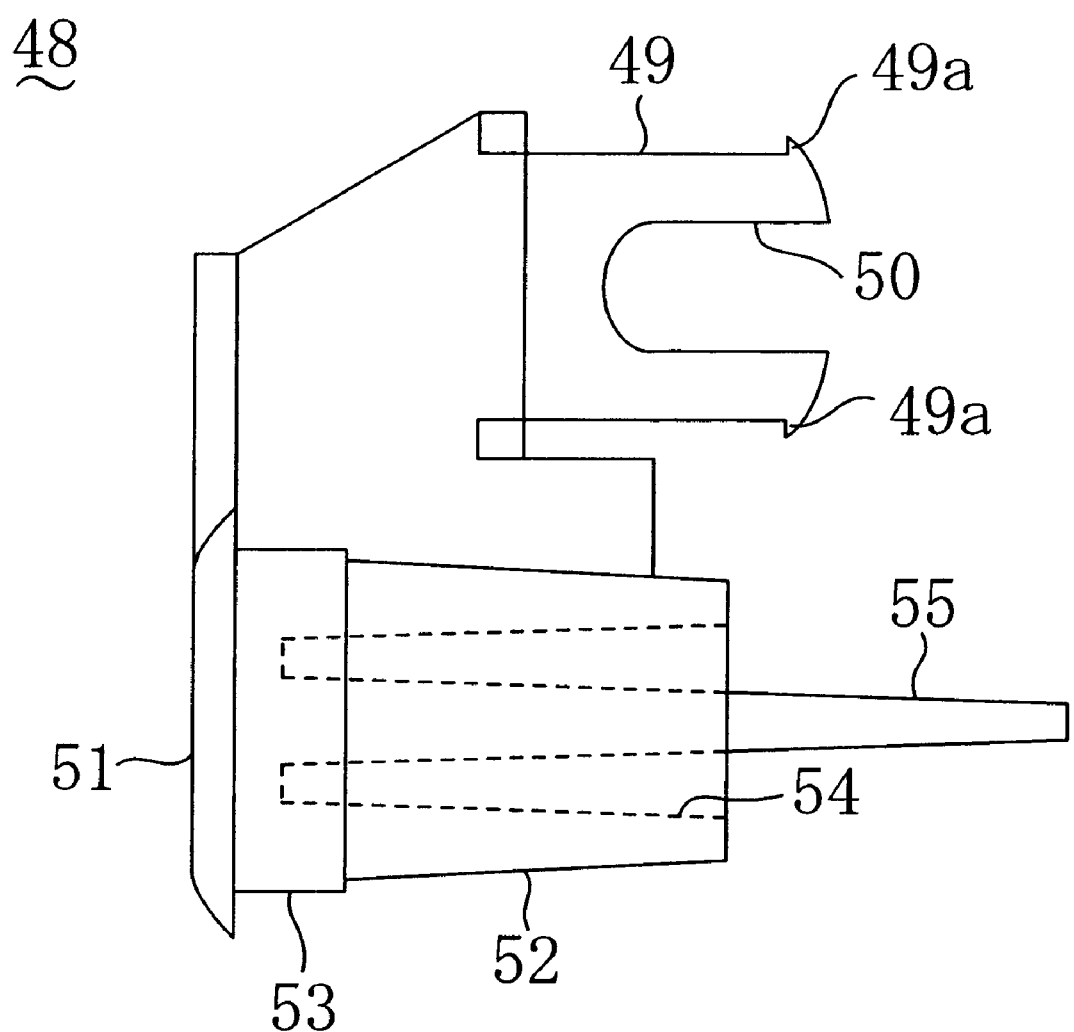
FIG. 19 is an enlarged front view of the second mount.

On the other hand, as shown in FIGS. 18 and 19, the second mount 48 includes a fixing part 49 disposed and accommodated in the upper accommodating section 31 of the grip body 1. Respective pawls 49a, 49a protrude from upper and lower side ends of the fixing part 49. The fixing part 49 is slidingly inserted into the engaging part 44 of the fixing part 43 of the first mount 42 to engage the engaging part 44 at the pawls 49a, 49a. This engagement between the fixing part 49 and the engaging part 44 causes the second mount 48 to be fixedly integrally engaged with the first mount 42. A reference numeral 50 denotes a notch formed to correspond to the screw free-receiving hole 9 of the first mount 42.

To the front side of the fixing part 49 of the second mount 48, a substantially cylindrical spacer part 51 is integrally connected which extends downwardly from the fixing part 49 to be disposed and accommodated in the spacer fitting part 5 of the grip body 1. One end portion of the spacer part 51 is composed of a tapered insert part 52 and a sealing part 53 extending radially outwardly from the insert part 52. As shown in FIG. 12, the insert part 52 of the spacer part 51 is inserted into the spacer fitting part 5 of the grip body 1 with a space of substantially uniform clearance defined therebetween to allow rotation of the grip body 1. The sealing part 53 is fitted onto the open end portion of the spacer fitting part 5 in liquid-tight manner. The sealing part 53 closes the open end portion of the spacer fitting part 5 so as to allow rotation relative to the opening, and seals the space between the outer periphery of the insert part 52 of the spacer part 51 and the inner periphery of the spacer fitting part 5, a space between the inner periphery of the hereinafter described recess 54 and the outer periphery of the fulcrum pin 37, and a space between the outer periphery of the hereinafter described loose-fit pin 55 and the inner periphery of the axial hollow 38 of the fulcrum pin 37. In FIG. 17, a reference numeral 47 denotes a cover similar to the cover 10 described in Embodiment 1.

Alternatively, if a sealing member such as an O-ring is interposed between the intermediate portion of the fulcrum pin 37 and the pin tight-fitting hole 34 of the partition 33 and/or between the opening of the spacer fitting part 5 and the sealing part 53 of the spacer part 51, the liquid-tight seal between these members can be further improved.

In the distal end surface of the spacer part 51 of the second mount 48, a recess 54 of a tapered hole diminishing its inner diameter toward the root end of the spacer part 51 (toward the bottom thereof) is formed coaxially with the outer periphery of the spacer part 51. A tapered. loose-fit pin 55 is extended coaxially and integrally from the bottom of the recess 54 to pass the inside of the recess 54 toward an opening thereof. The loose-fit pin 55 extends beyond the opening of the recess 54. When the spacer part 51 is inserted into the spacer fitting part 5 of the grip body 1, the distal end portion of the fulcrum pin 37 is rotatably inserted into the recess 54 of the spacer part 51 with a space of substantially uniform clearance defined therebetween, and the loose-fit pin 55 of the spacer part 51 is rotatably inserted into the axial hollow 38 of the fulcrum pin 37 with a space of substantially uniform clearance defined therebetween.

The three spaces between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of he loose-fit pin 55 of the spacer part 51 and the inner periphery of the axial hollow 38 of the fulcrum pin 37, are communicated with each other. A viscidity L is filled in and lies between these spaces. The viscidity L in these three-layered spaces form a damper 56 for generating torque providing resistance to swing motion of the grip body 1.

In assembling the assist grip G of this embodiment with the car body B, the root end of the fulcrum pin 37 is first inserted into the pin tight-fitting hole 34 of the partition 33 through the spacer fitting part 5 of the grip body 1. Then, the root end of the fulcrum pin 37 passing through the pin tight-fitting hole 34 is inserted into the torsion coil spring 16 and the pin loose-fitting hole 46 of the bearing part 45 of the first mount 42. Thereafter, the tight-fit part 39 of the fulcrum pin 37 is fixedly fitted into the support bore 4 of the pin support 3 of the grip body 1, and the flange-shaped stop 40 on the outer periphery of the fulcrum pin 37 is engaged on the side surface of the partition 33 of the grip body 1. In this manner, the fulcrum pin 37 is fixedly assembled in unitary relation to the grip body 1.

Subsequently, a desired amount of viscidity L is filled into the recess 54 of the spacer part 51 of the second mount 48, into the spacer fitting part 5 of the grip body 1 and into the axial hollow 37 of the fulcrum pin 37. Then, the first and second mounts 42, 48 are unitarily set by engaging the fixing part 49 of the second mount 48 to the engaging part 44 of the first mount 42 while sliding the former in the latter, and the spacer part 51 of the second mount 48 is inserted into the spacer fitting part 5 of the grip body 1. Through this insertion, the distal end portion of the fulcrum pin 37 and the loose-fit pin 55 of the spacer part 51 are telescopically inserted into the recess 54 of the spacer part 51 and the axial hollow 38 of the fulcrum pin 37, respectively. Also, as a result of the above insertion, the viscidity L is encapsulated in the respective spaces defined between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of the loose-fit pin 55 of the spacer part 51 and the inner periphery of the axial hollow 38 of the fulcrum pin 37.

The assist grip G, having been assembled with the first and second mounts 42, 48 in the above manner, is assembled to the car body by passing a screw through the screw free-receiving hole 9 of the fixing part 43 of the first mount 42 and fastening the first mount 42 to the car body through the screw. Thereafter, the hinged type cover 47 is closed to cover the aperture of the fixing part 43 thereby hiding the screw.

Accordingly, in this embodiment, the grip body 1 is shifted between its retracted position and use position while swinging relative to the bearing part 45 of the first mount 42 and the spacer part 51 of the second mount 48 in unitary relation to the fulcrum pin 37. At the time, the viscidity L lies in the respective spaces between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of the loose-fit pin 55 of the spacer part 51 and the inner periphery of the axial hollow 38 of the fulcrum pin 37. Therefore, for example, during the swing motion of the grip body 1 from use to retracted position, the viscosity of the viscidity L provides resistance to the swing motion of the grip body 1. Such resistance causes the grip body 1 to swing slowly from use to retracted position. Accordingly, it is prevented that the grip body 1 hits the car body hard to cause a beating sound. And, such slow swing motion provides an upscale image to the assist grip G.

Further, since the damper 56 is formed by filling the viscidity L into the respective spaces between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of the loose-fit pin 55 of the spacer part 51 and the inner periphery of the axial hollow 38 of the fulcrum pin 37, part of the damper 56 which provides rotational resistance is constructed in three layers of different diameters around the axis of rotation. Accordingly, the axial length of the damper 56 can be further shortened than Embodiment 1.

Furthermore, the grip body 1 is supported to the two mounts 42, 48 through the fulcrum pin 37. Therefore, the assist grip G can be built up from the grip body 1, the fulcrum pin 37, the two mounts 42, 48 and the torsion coil spring 16 only. Accordingly, the number of components of the assist grip G can be reduced, resulting in cost reduction. In addition, since the damper 56 is accommodated in the grip body 1, the appearance of the assist grip G can be improved.

(Embodiment 3)

Figure 20:
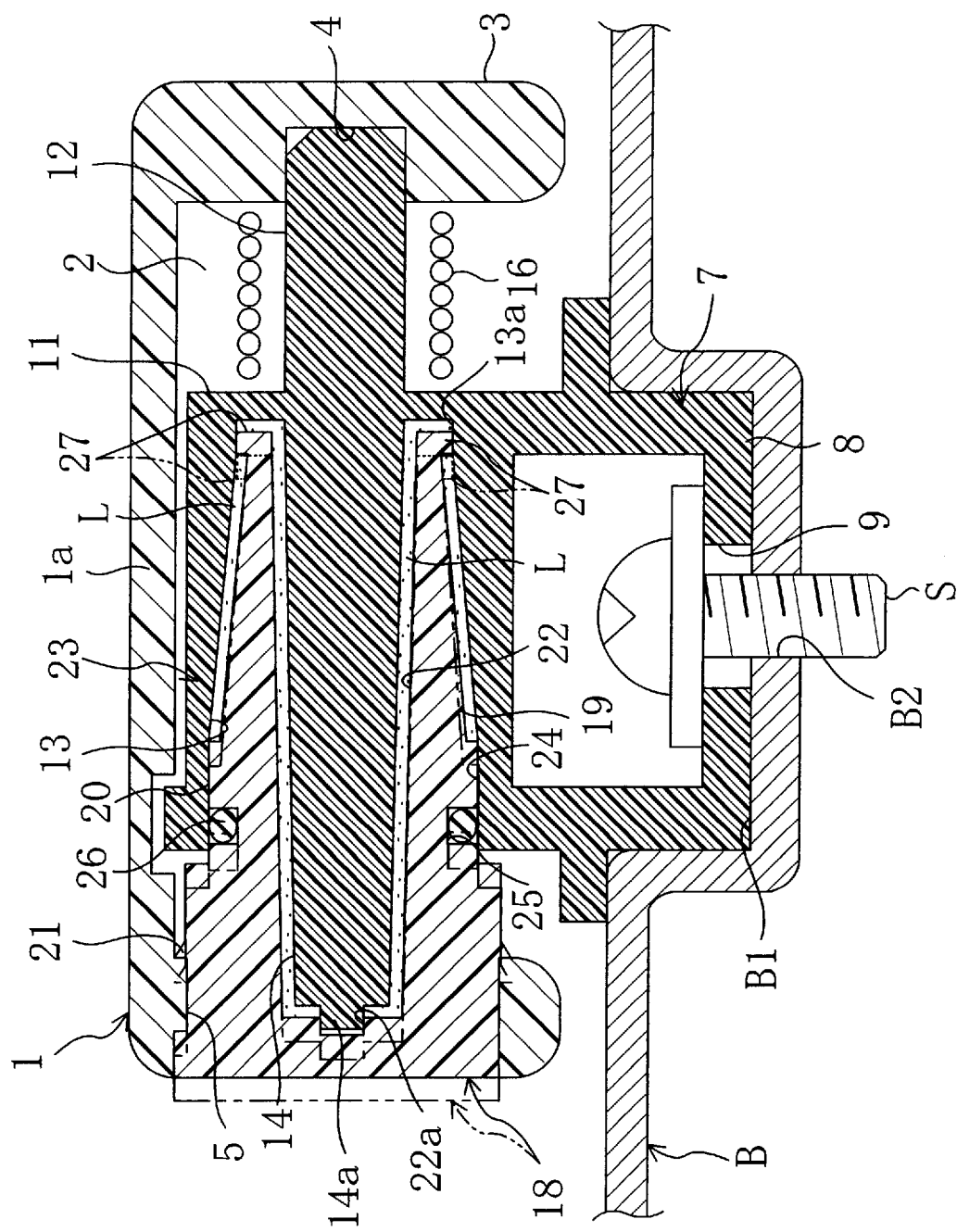
FIG. 20 is a diagram corresponding to FIG. 1, which shows an assist grip of Embodiment 3 of the present invention.
Figure 21:
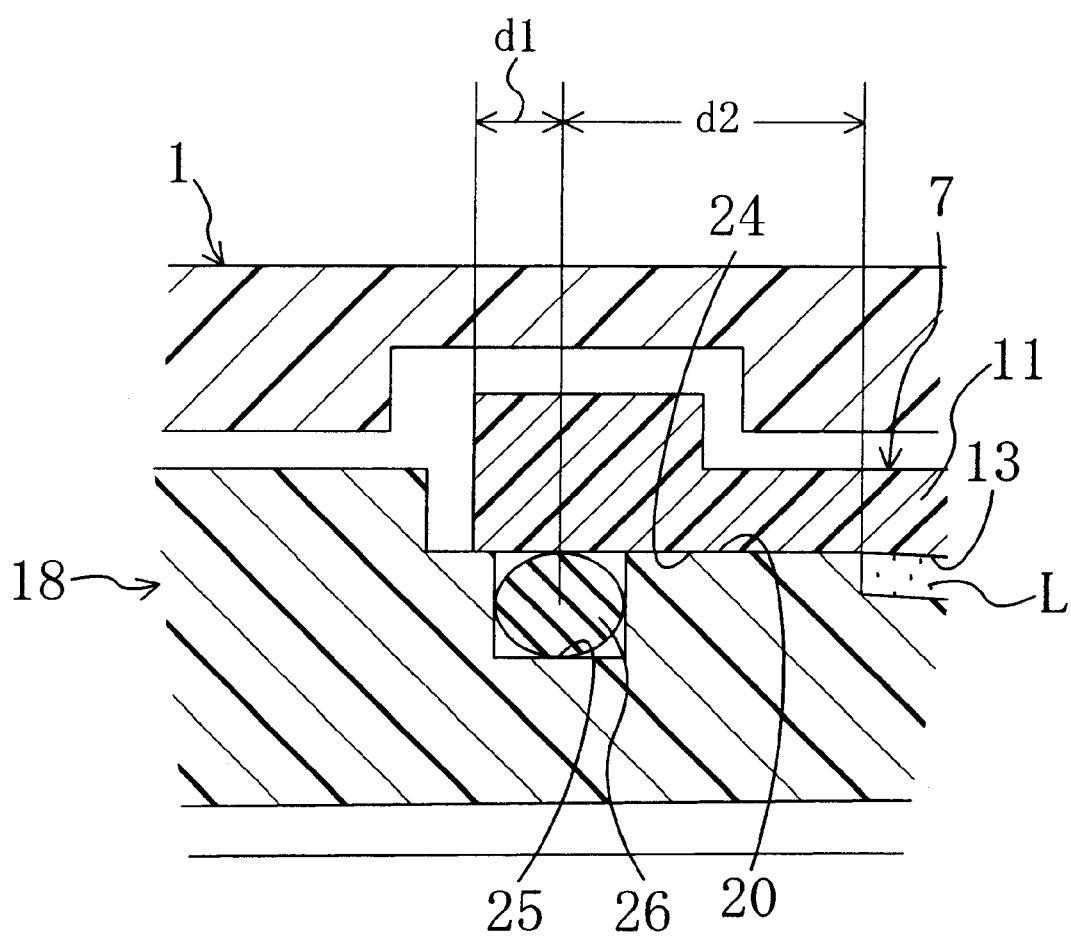
FIG. 21 is an enlarged cross-sectional view showing an essential part of the assist grip of Embodiment 3.
Figure 22:
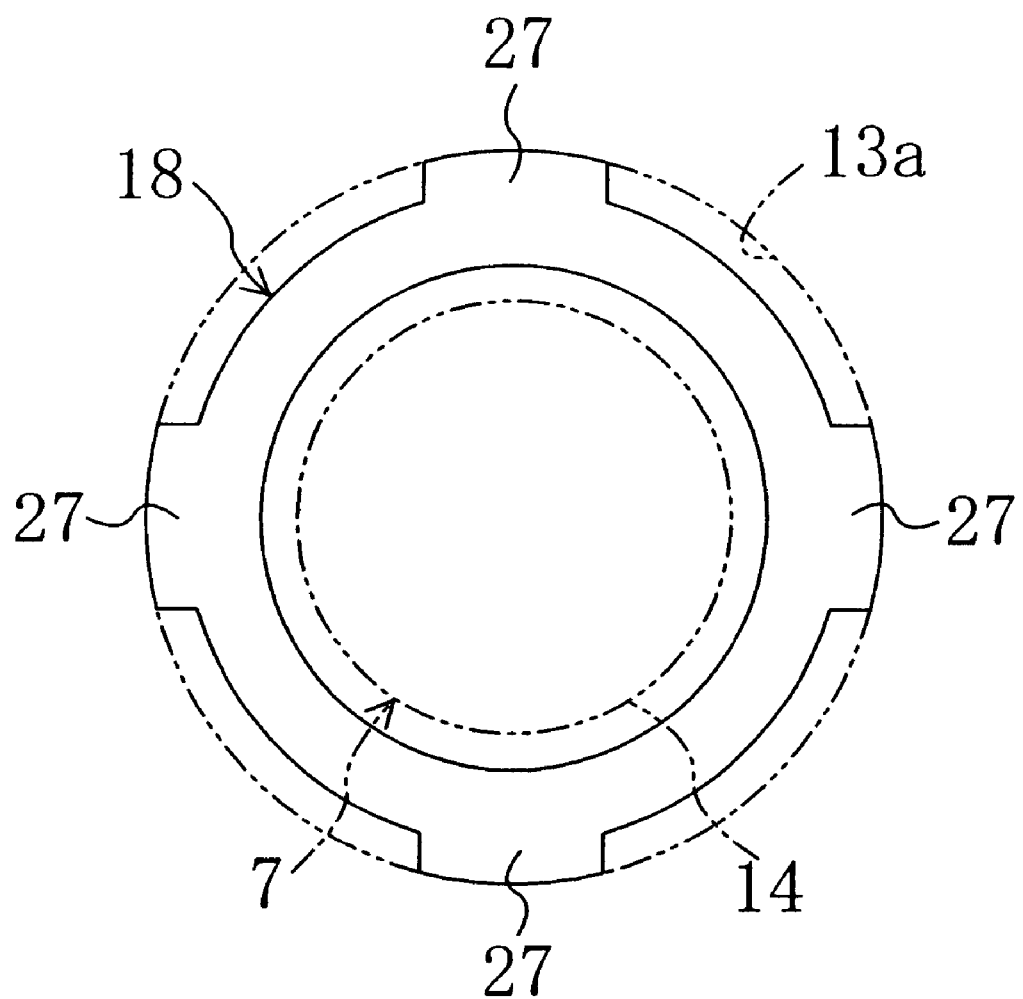
FIG. 22 is an enlarged side view of an end portion of a spacer.

FIGS. 20 through 22 show Embodiment 3 of the invention, which aims at providing a sealing member for liquid-tight sealing a space filled with the viscidity L from the outside and enhancing the bearing property of the mount 7 relative to the spacer 18 or the grip body 1.

Specifically, this embodiment is based on the structure of Embodiment 1 (see FIG. 1), in which an annular groove 25 is formed circumferentially in the outer periphery of the sealing part 20 of the spacer 18 corresponding to the sealing surface 24 located in the vicinity of the open end of the recess 13 of the amount 7, and a sealing member 26 such as an O-ring is inserted into the annular groove 25 so as to engage against the sealing surface 24. The engagement of the sealing member 26 against the sealing surface 24 seals from the outside the space between the outer periphery of the spacer 18 and the inner periphery of the recess 13 of the mount 7 and the space between the inner periphery of the pin loose-fitting part 22 of the spacer 18 and the outer periphery of the loose-fit pin 14 of the mount 7.

The sealing member 26 is placed, when the spacer 18 is assembled with the leg 1a of the grip body 1 by insertion into the recess 13 of the mount 7 and the viscidity L is filled with the spaces between the outer periphery of the spacer 18 and the inner periphery of the recess 13 of the mount 7 and between the inner periphery of the pin loose-fitting part 22 of the spacer 18 and the outer periphery of the loose-fit pin 14 of the mount 7 while expelling air from the spaces, to form a seal with the sealing surface 24 by engagement against the sealing surface 24 with the air in the spaces substantially fully expelled.

More specifically, as shown in enlarged manner in FIG. 21, the sealing member 26 is placed, when the spacer 18 is fully inserted into the recess 13 of the mount 7, on a portion of the sealing surface 24 closer to the opening of the recess 13 than the center of the sealing surface 24 in a direction of insertion of the sealing member 26 (lateral direction in FIGS. 20 and 21), in other words, at such a position that a distance dl between the sealing member 26 and one end of the sealing surface 24 located on an opening side of the recess 13 is smaller than a distance d2 between the sealing member 26 and the other end of the sealing surface 24 located on a bottom side of the recess 13 (i.e., d2>d1).

As also shown in FIG. 22, the bottom end portion of the inner periphery of the recess 13 of the mount 7 is formed with a cylindrical supporting surface 13a extending parallel with the axis of the recess 13. And, a plurality of (four in this example shown in the figure) support flanges 27, 27, are radially outwardly extended in circumferentially equally spaced relation on the outer periphery of the distal end of the insert part 19 of the spacer 18. The end faces (outer peripheries) of the support flanges 27 relatively slidably engage the supporting surface 13a located in the bottom end portion of the inner periphery of the recess 13 of the mount 7. The support flanges 27, 27, . . . support the distal end of the insert part 19 of the spacer 18 for rotation relative to the mount 7. The other structures are the same as in Embodiment 1.

The space between the outer periphery of the spacer 18 and the inner periphery of the recess 13 of the mount 7 is communicated with the space between the inner periphery of the pin loose-fitting part 22 and the outer periphery of the loose-fit pin 14 of the mount 7 through slots between the support flanges 27, 27.

Thus, in this embodiment, the sealing member 26 of the sealing part 20 of the spacer 18 is placed on a portion of the sealing surface 24 (a section of the inner periphery of the recess 13 in the vicinity of its open end) of the mount 7 closer to the opening of the recess 13 than the center of the sealing surface 24 in a direction of insertion of the sealing member 26. Therefore, in the assembly of the spacer 18, when the spacer 18 is inserted into the recess 13 of the mount 7 with necessary amounts of viscidities L previously received in the recess 13 and the pin loose-fitting part 22 of the spacer 18, respectively, and the viscidities L are thereby filled with the respective spaces defined between the outer periphery of the spacer 18 and the inner periphery of the recess 13 of the mount 7 and between the inner periphery of the pin loose-fitting part 22 of the spacer 18 and the outer periphery of the loose-fit pin 14 of the mount 7 while expelling air in both the spaces, a seal formation by engagement of the sealing member 26 against the sealing surface 24 is delayed as compared with the case where the sealing member 25 is placed at the center of the sealing surface 24 in the direction of insertion of the sealing member 26. As a result, as shown in imaginary lines in FIG. 20, the sealing member 26 forms a seal by engagement against the sealing surface 24 with substantially full air expelled from both the spaces. This allows to expel as much the air in the spaces as possible to fill the spaces with substantially the viscidity L alone and correspondingly enhances the damping effect of the viscidity L.

Further, in this embodiment, the plurality of support flanges 27, 27, . . . are extended on the outer periphery of the distal end of the insert part 19 of the spacer 18, the end faces (outer peripheries) of the support flanges 27 slidably engage the supporting surface 13a located in the bottom end portion of the inner periphery of the recess 13 of the mount 7, and the support flanges 27, 27, . . . support the distal end of the insert part 19 of the spacer 18 for rotation relative to the mount 7. Accordingly, the spacer 18 can be supported not only with the bottom (base end) of the pin loose-fitting part 22 to the loose-fit pin 14 of the mount 7 but also with the distal end of the insert part 19 to the supporting surface 13a in the bottom end portion of the inner periphery of the recess 13 through the support flanges 27. This enhances the bearing property of the mount 7 relative to the spacer 18 or the grip body 1.

In this embodiment, a portion of the inner periphery of the recess 13 of the mount 7 located in the vicinity of the open end of the recess 13 is formed into the sealing surface 24, the annular groove 25 is formed in the outer periphery of the sealing part 20 of the spacer 18, and the sealing member 26 is inserted into the annular groove 25. On the contrary, the outer periphery of the sealing part 20 of the spacer 18 may be formed into a sealing surface, an annular groove may be formed in a portion of the inner periphery of the recess 13 of the mount 7 located in the vicinity of the open end of the recess 13, and the sealing member may be inserted into the annular groove. This modified structure also exerts the same operations and effects as obtained in Embodiment 3.

Further, in Embodiment 3, the outer periphery of the distal end of the insert part 19 of the spacer 18 is formed with the plurality of support flanges 27, 27, . . . which slidably engage the supporting surface 13a located in the bottom end portion of the inner periphery of the recess 13 of the mount 7. On the contrary, the bottom end portion of the inner periphery of the recess 13 of the mount 7 maybe formed with a plurality of radially inwardly extending support flanges in circumferentially equally spaced relation, and the support flanges may engage for relative sliding movement against a cylindrical supporting surface provided on the outer periphery of the distal end of the insert part 19 of the spacer 18.

(Embodiment 4)

Figure 23:
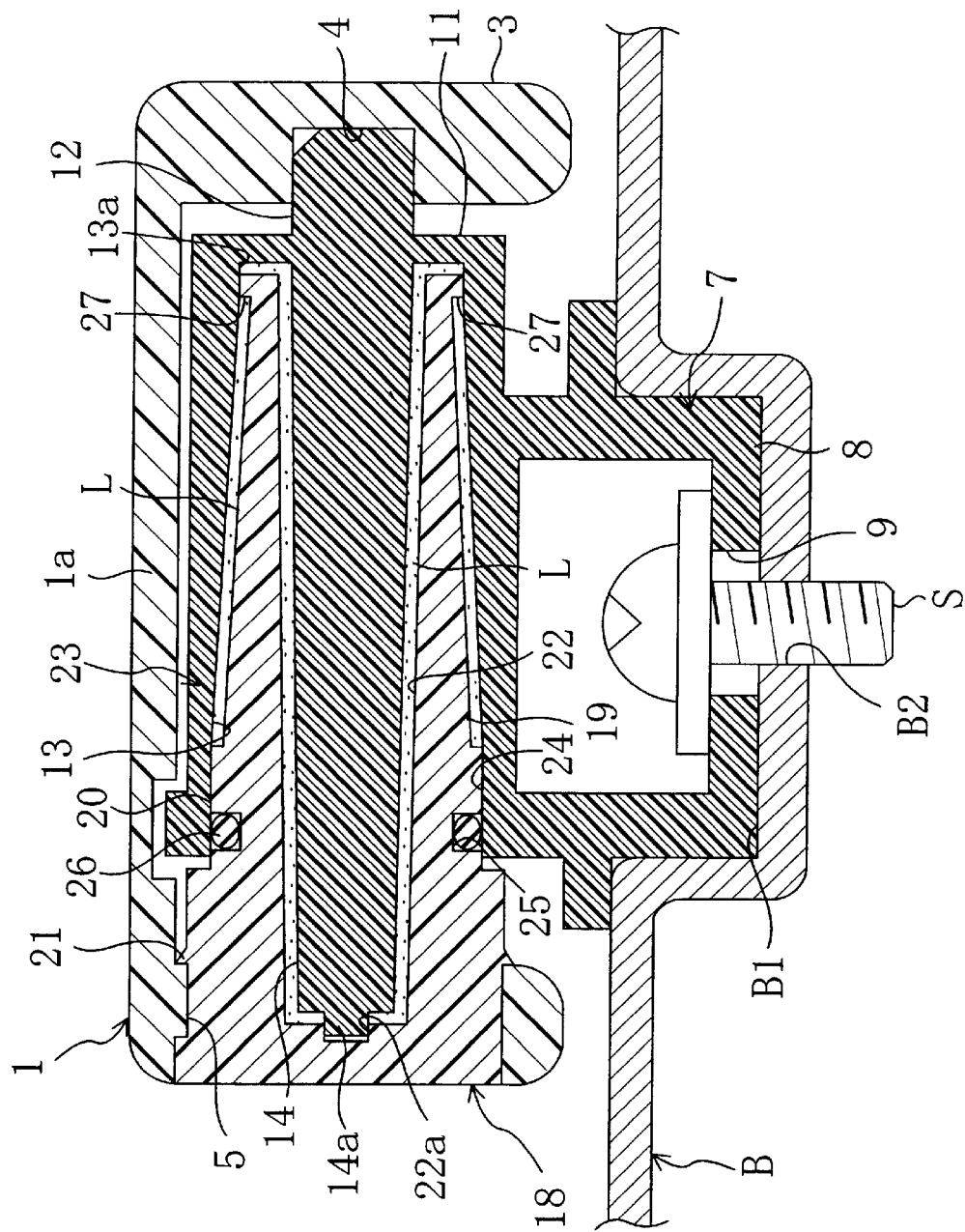
FIG. 23 is a diagram corresponding to FIG. 1, which shows a mounting structure of one of legs of a grip body in Embodiment 4 of the present invention.
Figure 24:
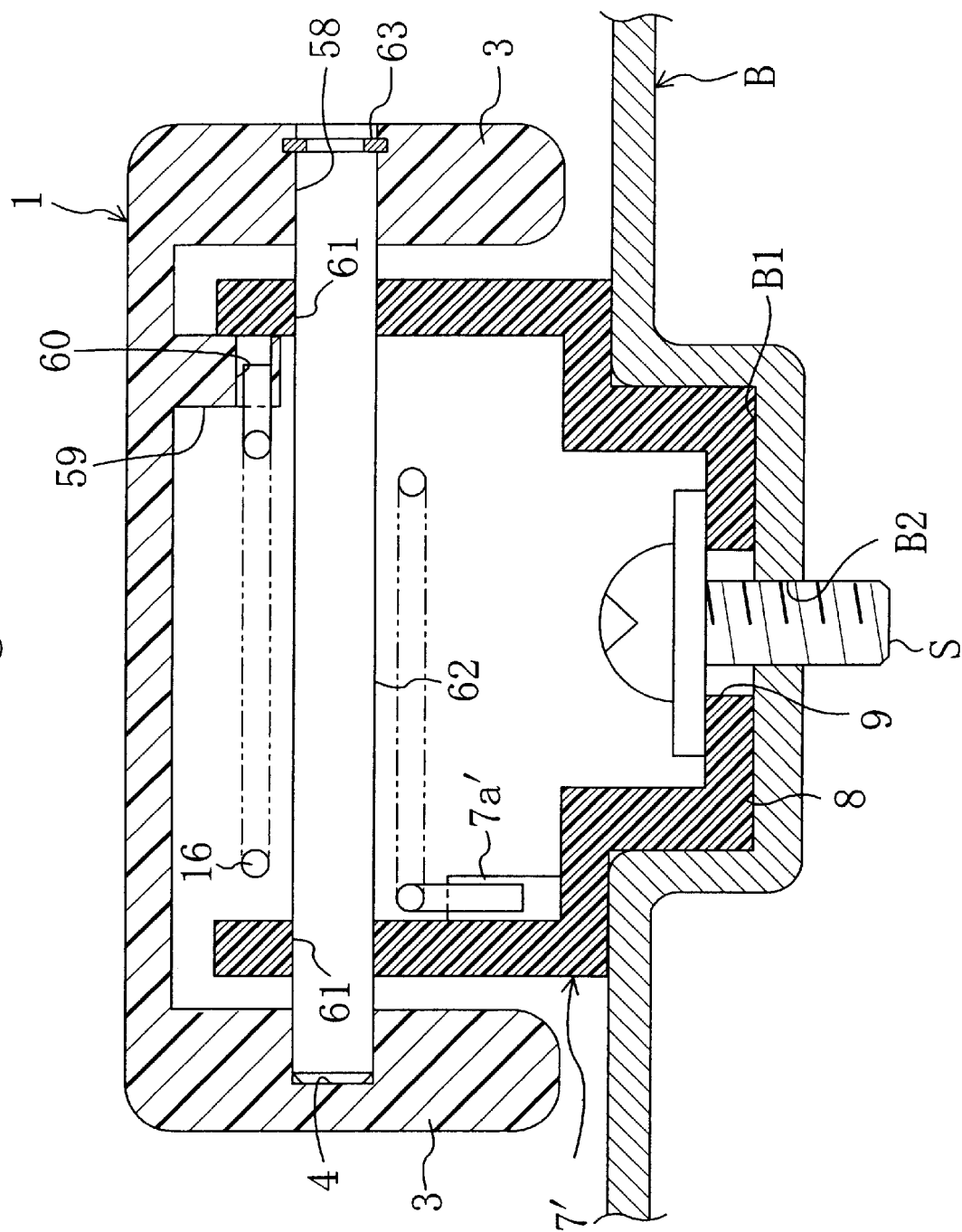
FIG. 24 is a diagram corresponding to FIG. 1, which shows a mounting structure of the other leg of the grip body.
Figure 25:
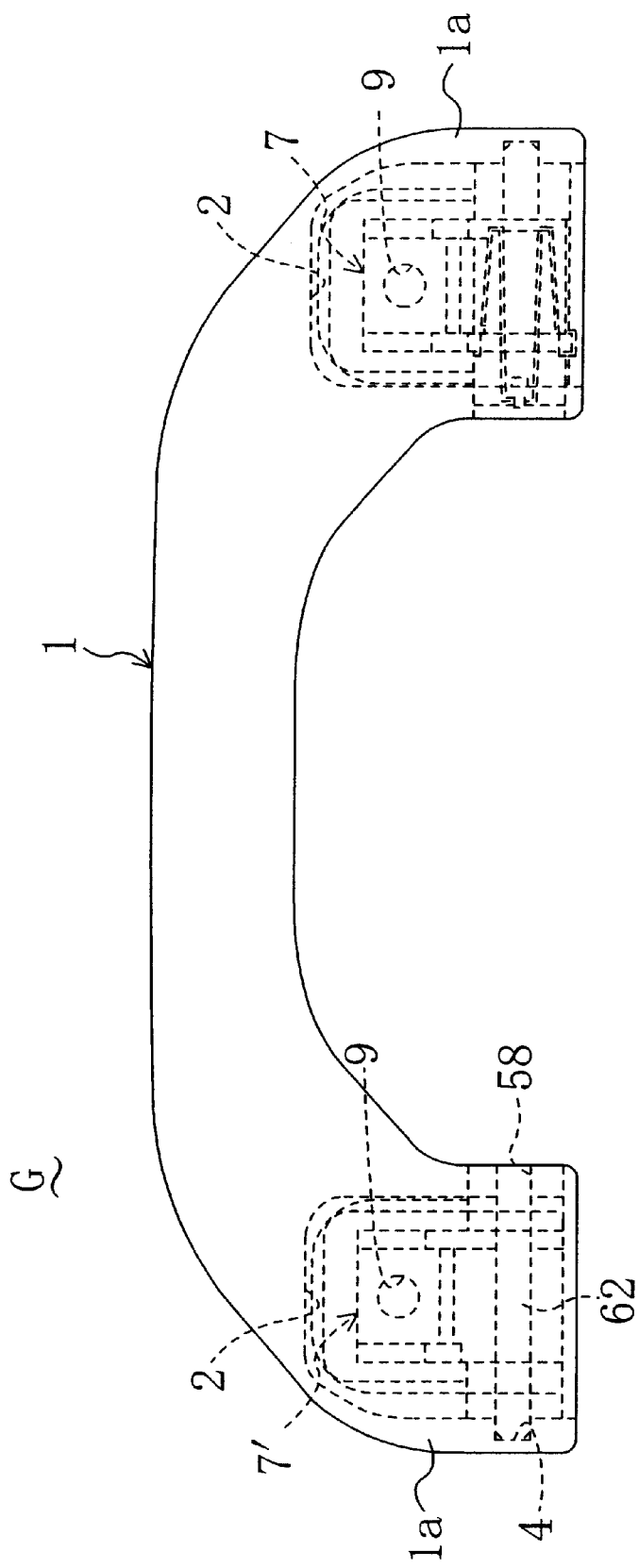
FIG. 25 is a front view showing the grip body in which mounts are mounted to the right- and left-hand legs in Embodiment 4.

FIGS. 23 through 25 show Embodiment 4 of the invention. Unlike the aforementioned embodiments in which the torsion coil spring 16 and the damper 23 are provided in the common leg (right-hand leg) 1a of the grip body 1, this embodiment is constructed so that the right- and left-hand legs 1a, 1a of the grip body 1 each separately include one of the spring 16 and the damper 23.

Specifically, in this embodiment, as shown in FIG. 25, the right- and left-hand legs 1a, 1a of the grip body 1 are pivotally mounted for swing motion onto mounts 7, 7', respectively. The damper 23 is provided only between the right-hand leg 1a as one of the legs and the mount 7, while the torsion coil spring 16 is provided only between the left-hand leg 1a as the other leg and the mount 7'.

As shown in enlarged manner in FIG. 23, the mechanism of mounting the right-hand leg 1a of the grip body 1 onto the mount 7 and the mechanism of forming the damper 23 in the right-hand leg 1a are essentially the same as in Embodiment 3 (see FIG. 20), but this embodiment is different from Embodiment 3 only in that the right-hand leg 1a does not include the torsion coil spring 16. Further, in correspondence with the lack of the torsion coil spring 16, the length of the fulcrum pin 12 is reduced and the depth of the recess 13 of the mount 7, the length of the loose-fit pin 14 and the length of the tapered insert part 19 of the spacer 18 are increased. This results in increasing the axial lengths of the spaces defined between the outer periphery of the spacer 18 and the inner periphery of the recess 13 of the mount 7 and between the inner periphery of the pin loose-fitting part 22 of the spacer 18 and the outer periphery of the loose-fit pin 14 of the mount 7.

On the other hand, as shown in FIG. 24, the mount 7' for pivotally mounting the left-hand leg 1a of the grip body 1 is mounted onto the car body B in the same manner as the mount 7 for pivotally mounting the right-hand leg 1a is done. In the figure, same components as used in the right-hand mount 7 are indicated by like reference characters and detailed description thereof will be omitted. An accommodating section 2 for accommodating the mount 7' is formed in the left-hand leg 1a of the grip body 1, and laterally opposed sidewalls of the left-hand leg 1a located on both lateral sides of the accommodating section 2 are formed into pin supports 3 and 3, respectively. Bottomed and through support holes 4 and 58 are coaxially formed in the inside surfaces of the pin supports 3, 3 located on the left and right sides in FIG. 24, respectively. Further, a spring anchor lug 59, is integrally extended from the inner bottom wall (upside wall in FIG. 24) of the accommodating section 2 of the left-hand leg 1a of the grip body 1 at a position thereof close to the right-hand pin support 3. The spring anchor lug 59 is formed with a through hole 60 extending substantially parallel with the support holes 4, 58 of the left- and right-hand pin supports 3, 3.

A portion of the mount 7' accommodated in the accommodating section 2 of the left-hand leg 1a of the grip body 1 is formed in the shape of a rectangular box open to the opposite side to a portion thereof mounted to the car body B. Pin receiving holes 61, 61 are coaxially formed through right and left sidewalls of the box, respectively. A laterally extending fulcrum pin 62 is passed through and mounted in both the pin receiving holes 61, 61. Both end portions of the fulcrum pin 62 are rotatably inserted into the support holes 4, 58 of both the pin supports 3, 3 in the left-hand leg 1a.

The torsion coil spring 16 is disposed on the fulcrum pin 62. One end of the spring 16 is hooked through the hole 60 of the spring anchor lug 59, while the other end extends, for example, radially outwardly, beyond the other portions and bears against a spring abutment 7a' provided on the left sidewall of the mount 7' shown in FIG. 24. The grip body 1 is urged into swing motion from the use position toward the retracted position by the torque of the spring 16.

In a condition that the support holes 4, 58 of both the pin supports 3, 3 of the left-hand leg 1a of the grip body 1 are coaxially aligned with the pin receiving holes 61, 61 of the mount 7', the fulcrum pin 62 is inserted from the support hole 58 of the left-hand leg 1a through the pin receiving holes 61, 61 of the mount 7' into the support hole 4. After the insertion of the fulcrum pin 62, a snap ring 63 is inserted into the support hole 58 to a position of one end of the fulcrum pin 62 and fitted thereinto against the drop-out of the fulcrum pin 62.

The other structures are the same as in Embodiment 3 and therefore the same effects as obtained in Embodiment 3 can also be obtained in this embodiment.

The structures of Embodiment 4 may be combined with those of Embodiment 1 so that the torsion coil spring 16 and the damper 23 are provided in one of the legs 1a of the grip body like Embodiment 1 and an additional torsion coil spring 16 is provided in the other leg 1a.

(Embodiment 5)

Figure 26:
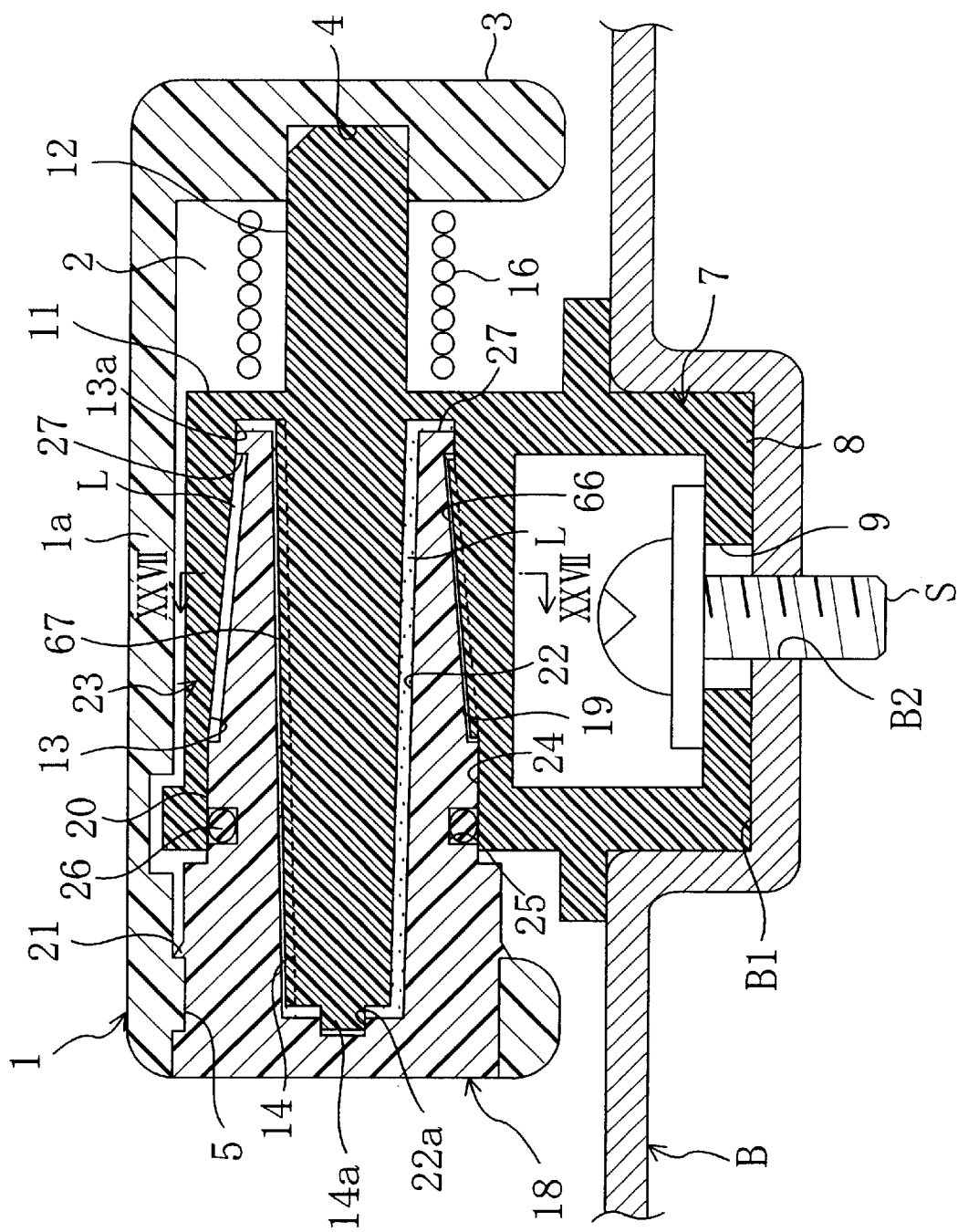
FIG. 26 is a diagram corresponding to FIG. 1, which shows an assist grip of Embodiment 5 of the present invention.
Figure 27:
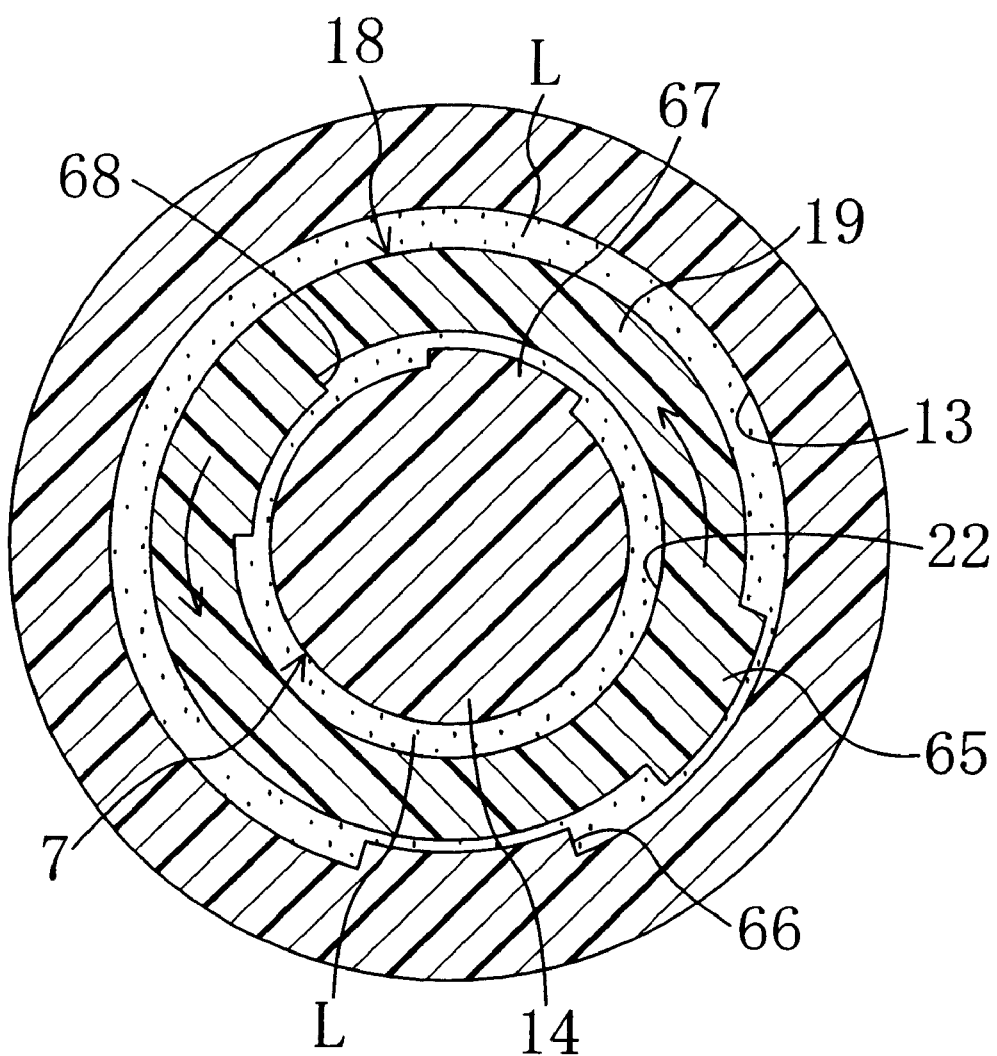
FIG. 27 is a cross-sectional view taken along the line XXVII—XXVII of FIG. 26.
Figure 28:
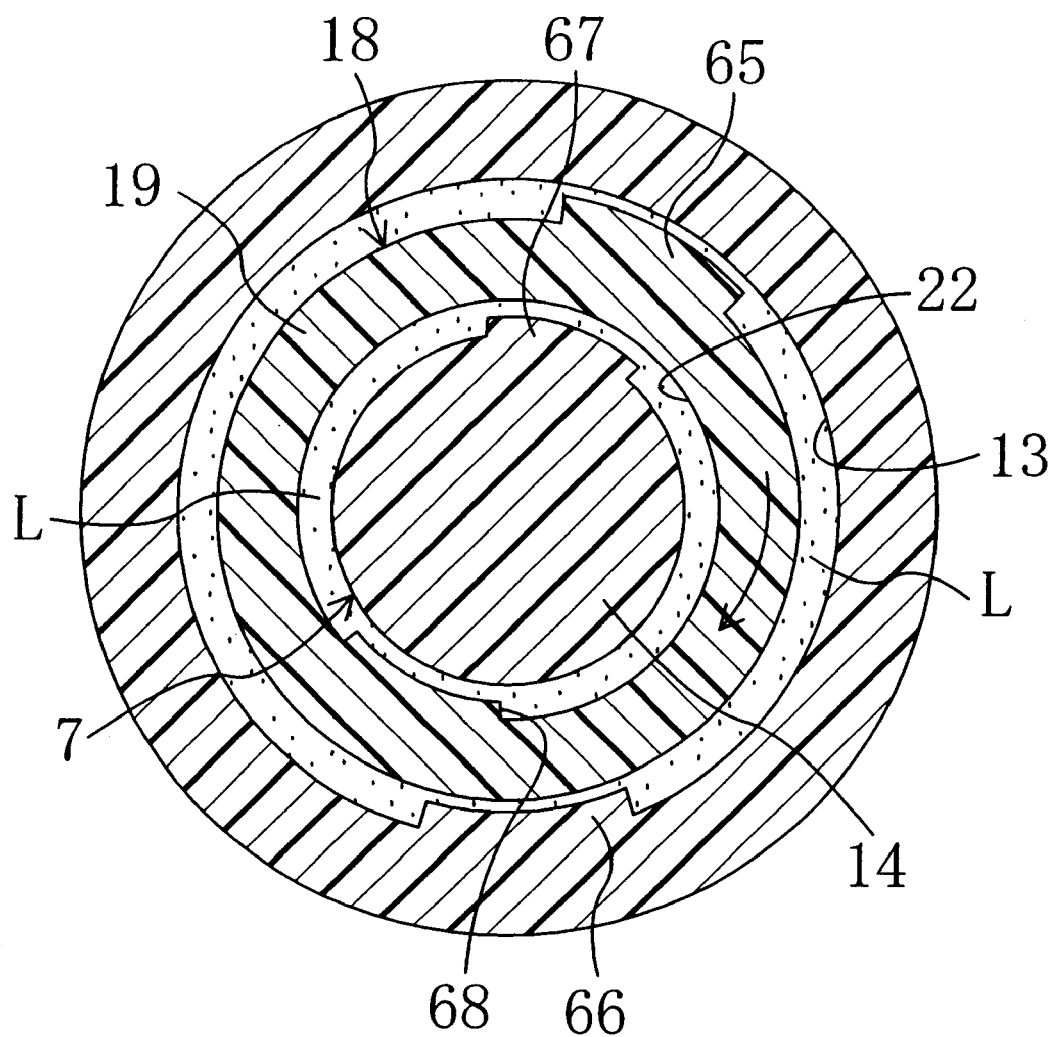
FIG. 28 is a diagram corresponding to FIG. 27, which shows that the grip body is in its use position.

FIGS. 26 through 28 show Embodiment 5 of the invention. This embodiment aims at enhancing the flow resistance of the viscidity L.

Specifically, like Embodiment 3 (see FIG. 20), this embodiment is configured so that the tapered insert part 19 of the spacer 18 is inserted into the recess 13 of the mount 7, the viscidity L is encapsulated in the spaces defined between the outer periphery of the insert part 19 and the inner periphery of the recess 13 and between the inner periphery of the pin loose-fitting part 22 of the spacer 18 and the outer periphery of the loose-fit pin 14 of the mount 7. In this configuration, a first restriction 65 is formed integrally on the outer periphery of the insert part 19 of the spacer 18 so as to be radially outwardly raised therefrom. The first restriction 65 is formed of a rib extending along the axis of the insert part 19 over substantially the entire length of the outer periphery of the insert part 19, and the top surface thereof is opposed to the inner periphery of the recess 13 of the mount 7 so as to be spaced apart from each other by a predetermined clearance.

On the other hand, a second restriction 66 is formed integrally on the inner periphery of the recess 13 of the mount 7 so as to be radially inwardly raised therefrom. As shown in FIG. 26, the second restriction 66 is formed of a rib extending along the axis of the recess 13 over substantially the entire length of the inner periphery of the recess 13, and the top surface thereof is opposed to the outer periphery of the insert part 19 of the spacer 18 so as to be spaced apart from each other by a predetermined clearance. And, as shown in FIGS. 27 and 28, the first and second restrictions 65, 66 are placed at positions to allow the swing motion of the grip body between the use position (shown in FIG. 28) and the retracted position (shown in FIG. 27) without interference with each other.

Furthermore, a third restriction 67 is formed integrally on the outer periphery of the loose-fit pin 14 of the mount 7 so as to be radially outwardly raised therefrom. The third restriction 67 is formed of a rib extending along the axis of the loose-fit pin 14 over substantially the entire length of the outer periphery of the loose-fit pin 14 , and the top surface thereof is opposed to the inner periphery of the pin loose-fitting part 22 of the spacer 18 so as to be spaced apart from each other by a predetermined clearance. On the other hand, a fourth restriction 68 is formed integrally on the inner periphery of the pin loose-fitting part 22 of the spacer 18 so as to be radially inwardly raised therefrom. The fourth restriction 68 is formed of a rib extending along the axis of the pin loose-fitting part 22 over substantially the entire length of the inner periphery of the pin loose-fitting part 22, and the top surface thereof is opposed to the outer periphery of the loose-fit pin 14 of the mount 7 so as to be spaced. apart from each other by a predetermined clearance. And, the third and fourth restrictions 67, 68 are placed at positions to allow the swing motion of the grip body 1 between the use and retracted positions, like the first and second restrictions 65, 66.

Accordingly, in this embodiment, when the passenger releases the grip body 1 in use position shown in FIG. 28, the grip body 1 automatically swing clockwise of FIG. 28 by the bias of the torsion coil spring 16 and moves from the use position to the retracted position shown in FIG. 27. Further, as described above, the first and second restrictions 65, 66 are extended on the outer periphery of the insert part 19 of the spacer 18 and the inner periphery of the recess 13 of the mount 7, respectively. Therefore, the viscidity L in a zone between the approaching first and second restrictions 65, 66 in the space between the outer periphery of the insert part 19 of the spacer 18 and the inner periphery of the recess 13 is pressurized by the first and second restrictions 65, 66 during the above swing motion of the grip body 1. Accordingly, the viscidity L in the zone between the approaching first and second restrictions 65, 66 flows into an opposite zone (a zone between the first and second restrictions 65, 66 moving away from each other) while being squeezed through the clearance between the first restriction 65 and the inner periphery of the recess 13 of the mount 7 and the clearance between the second restriction 66 and the outer periphery of the spacer 18.

In addition, during the clockwise swing motion of the grip body 1 from use to retracted position, also in the space between the inner periphery of the pin loose-fitting part 22 of the spacer 18 and the outer periphery of the loose fit pin 14 of the mount 7, the viscidity L in a zone between the fourth restriction 68 on the inner periphery of the pin loose-fitting part 22 and the third restriction 67 on the outer periphery of the loose fit pin 14 is pressurized by approach of both the restrictions 67, 68, and thereby flows into an opposite zone (a zone between the third and fourth restrictions 67, 68 moving away from each other) while being squeezed through the clearance between the fourth restriction 68 and the outer periphery of the loose fit pin 14 of the mount 7 and the clearance between the third restriction 67 and the inner periphery of the pin loose-fitting part 22 of the spacer 18.

As a result, the damping effect is enhanced by the flow resistances of the viscidity L passing through the restrictions 65–68 to reduce the swinging speed of the grip body 1, which can further slowly swing the grip body 1.

In this embodiment, each of the restrictions 65 through 68 is formed along the axis over substantially the entire length of the corresponding surface. Such an arrangement is preferable because it can provide a maximum damping effect. However, each length of the restrictions 65 through 68 may not necessarily be maximized as described above but may be reduced as necessary or may be arbitrarily set depending upon, for example, the property of the viscidity L or the bias of the torsion coil spring 16.

Further, in Embodiment 5, four restrictions in all, i.e., the first through fourth restrictions 65–68, are formed. However, only the first and second restrictions 65, 66 may be formed. Alternatively, only the third and fourth restrictions 67, 68 may be formed.

(Embodiment 6)

Figure 34:
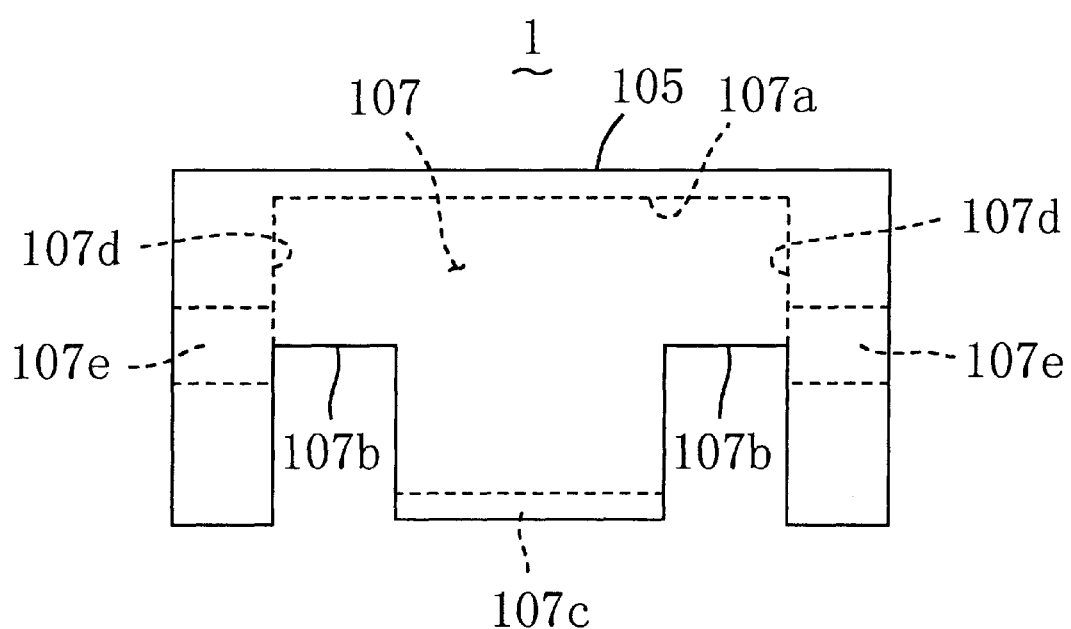
FIG. 34 is a bottom view of a leg of the grip body.
Figure 35:
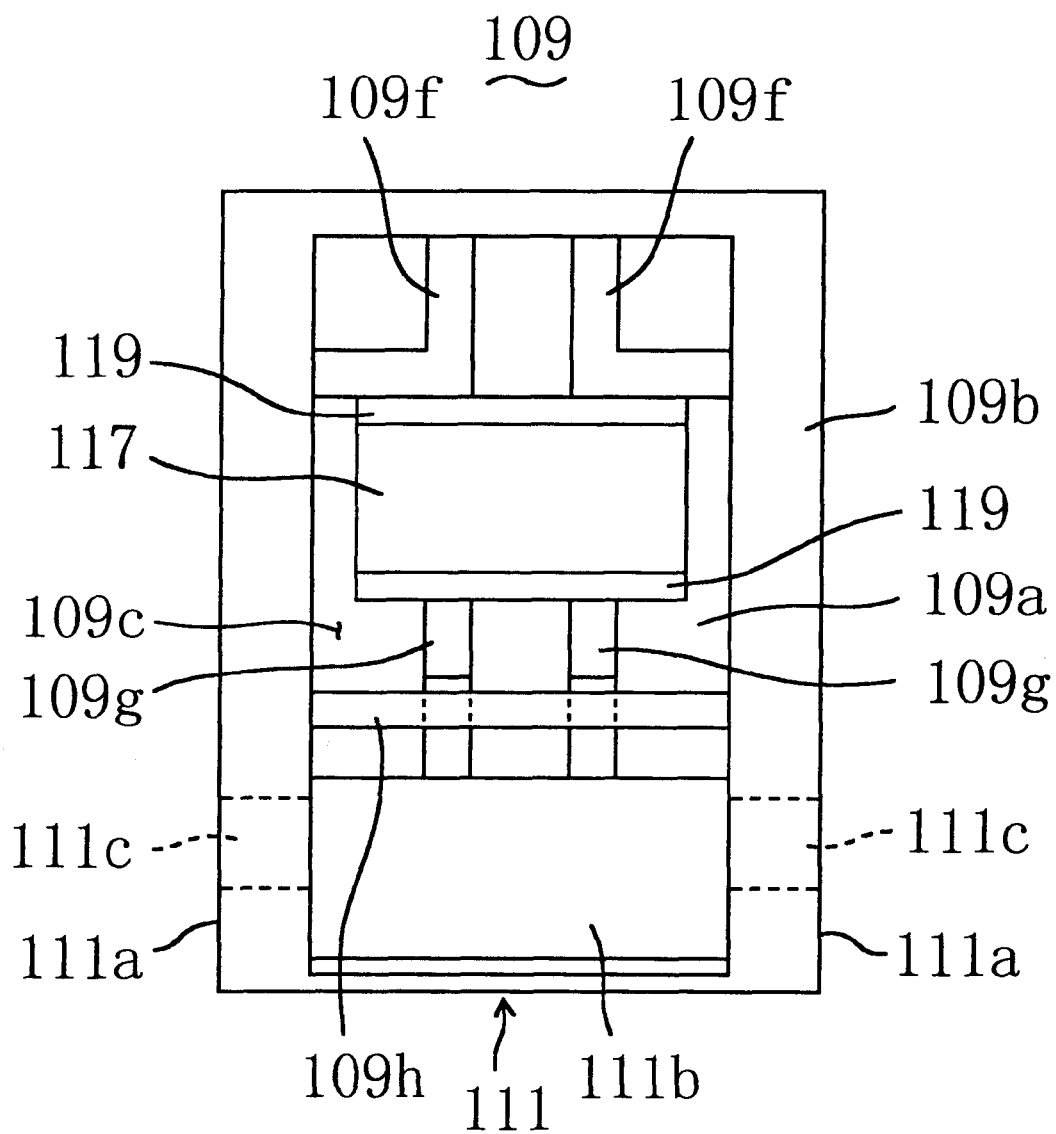
FIG. 35 is an plan view of the mount body.
Figure 36:
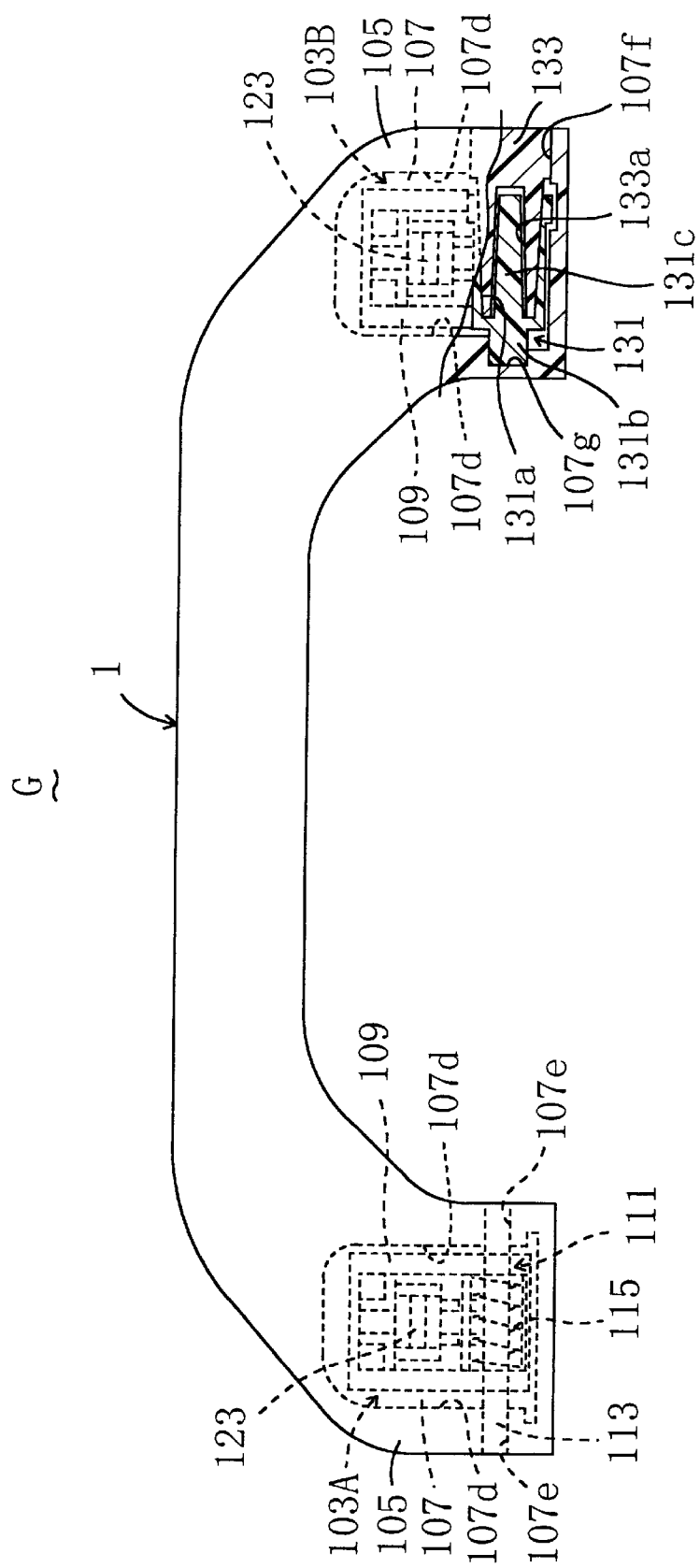
FIG. 36 is a diagram showing the entire assist grip.

FIGS. 29 through 36 show a retractable assist grip G according to Embodiment 6 of this invention. This assist grip G includes an elongated grip body 1 made of resin such as PP and mounts 103A and 103B made of resin such as POM. The grip body 1 and the mounts 103A, 103B are separate parts. The grip body 1 is curved approximately in the shape of a bracket and has a pair of legs 105, 105 at the lengthwise right and left ends. The left-hand leg 105 as viewed in FIG. 36 is pivotally mounted to the mount 103A, while the right-hand leg 105 as viewed in FIG. 36 is pivotally mounted to the mount 103B. Since the mounts 103A and 103B have the below-described common characteristics, though they have different hinge structures (see FIG. 36), the common parts will be described with reference to the mount 103A alone without using the mount 103B.

Figure 29:
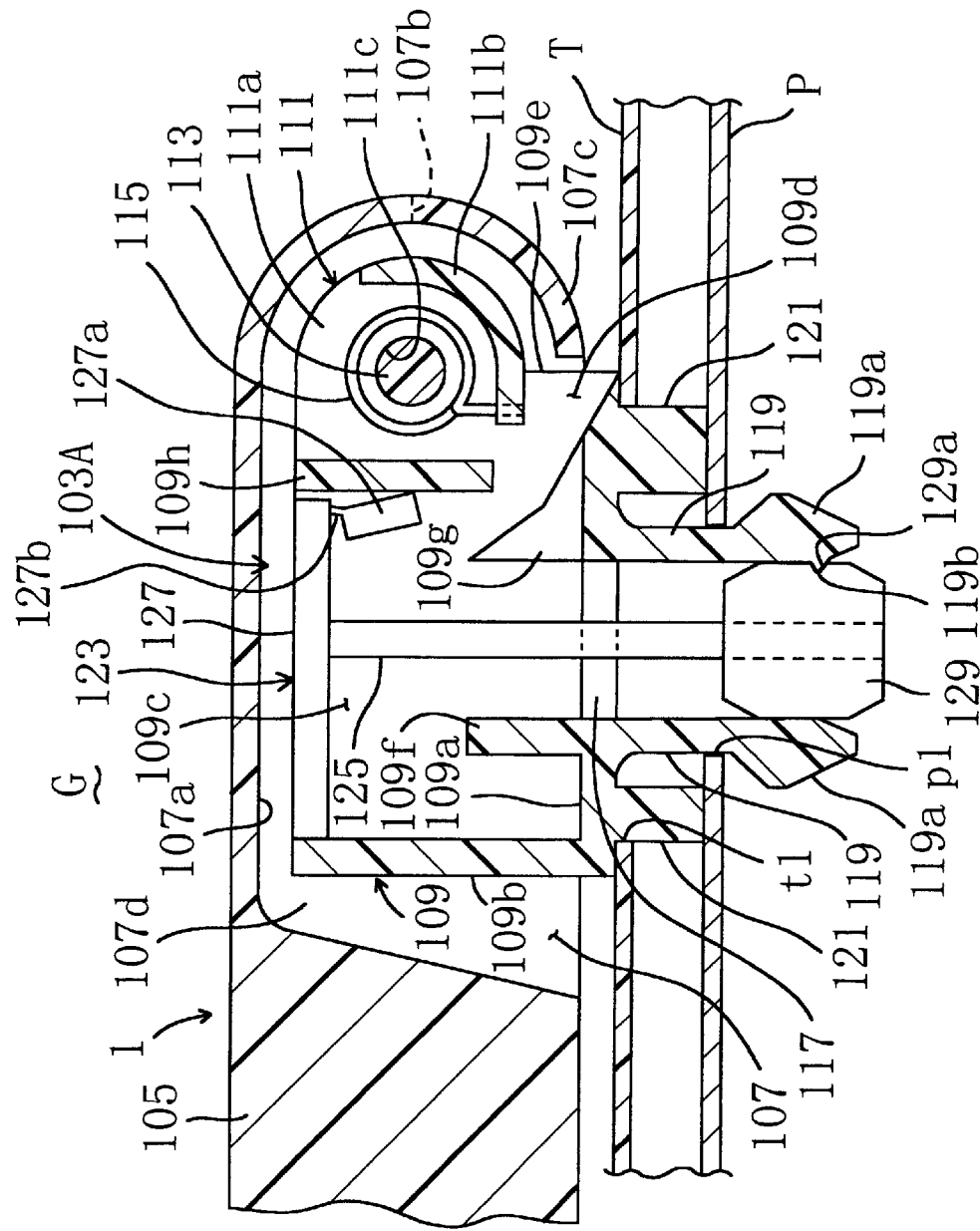
FIG. 29 is a longitudinal cross-sectional view showing that an assist grip according to Embodiment 6 is mounted to an inner pane
Figure 33:
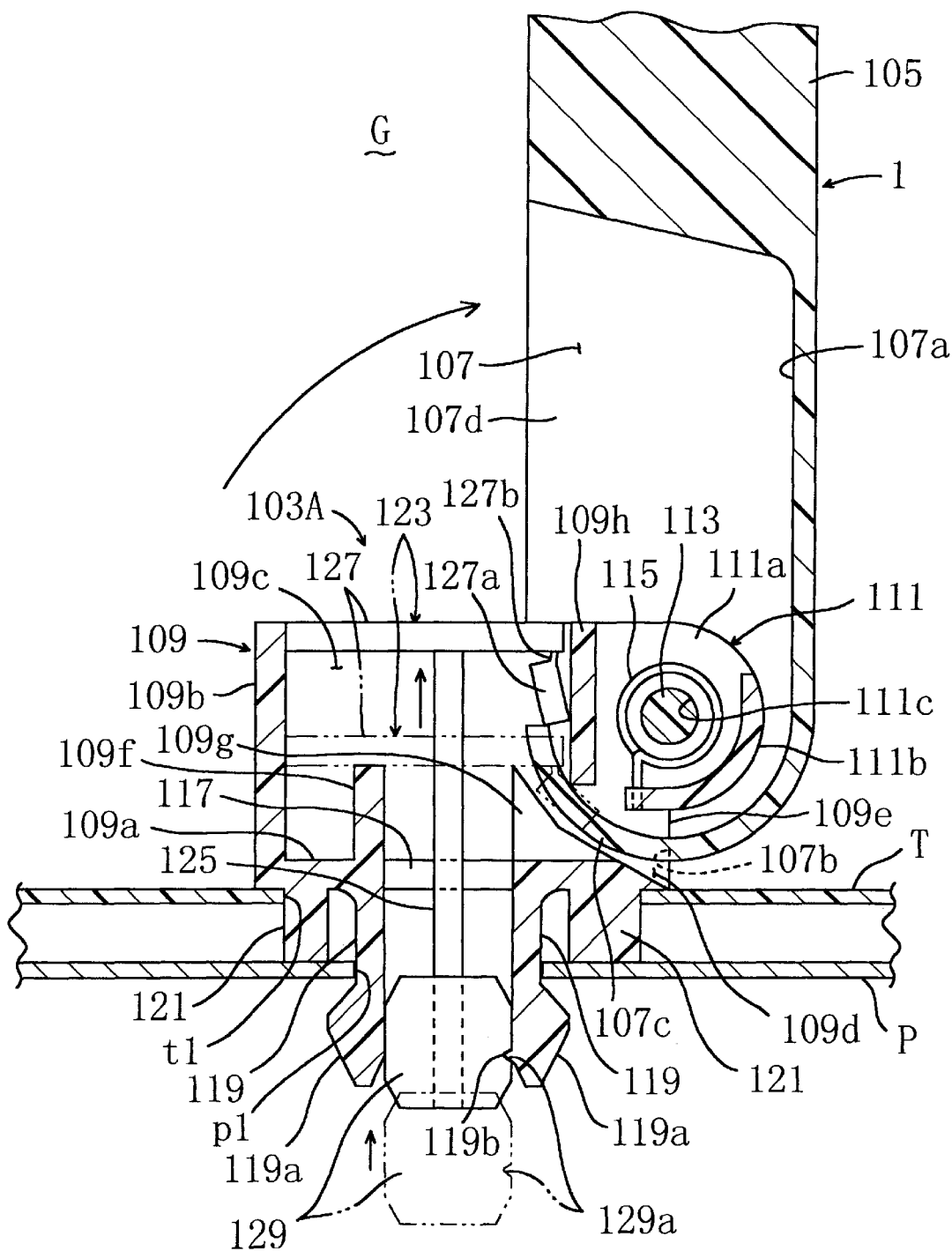
FIG. 33 is a longitudinal cross-sectional view showing that the assist grip has been mounted to the inner panel by swing motion of the grip body to its use position.

The assist grip G is mounted to an inner panel P as a car body panel (fixed body) through the two mounts 103A, 103B. The inner panel P is covered with a ceiling member T as an internal trim part. At a position of the inner panel P at which the assist grip is mounted, two rectangular mounting holes p1 are formed to correspond to the two legs 105 of the assist grip G and have a distance therebetween corresponding to that between the two legs 105. Further, at a position of the ceiling member T at which the assist grip is mounted, two rectangular mounting holes t1 larger in diameter than the mounting holes p1 are formed to correspond to the two legs 105 of the assist grip G and have a distance therebetween corresponding to that between the two legs 105. The mounts 103A, 103B are mounted in the two mounting holes p1 of the inner panel P, respectively. In this mounted condition, the grip body 1 is swung between its use and retracted positions. Here, the retracted position of the grip body 1 means, as shown in FIG. 29, the position when the grip body 1 is directed upward (to the left in FIG. 29) and lies along the ceiling member T forming substantially a perpendicular surface. On the other hand, the use position thereof means, as shown in FIG. 33, the position when the grip body 1 is directed to the car room and extends substantially horizontally.

An accommodating section 107 is formed on the back of the leg 105 of the grip body 1 (on the side thereof opposed to the ceiling member T in the retracted position of the assist grip) so as to be recessed in an approximately rectangular shape upwardly from the bottom end of the leg 105. In the retracted position of the assist grip, the leg 105 is held against interference with the mount 103A, 103B by accommodating in the accommodating section 107 a hereinafter described mount body 109 of the mount 103A, 103B extending toward the car room from the ceiling member T. As shown in FIG. 34, the bottom end of the leg 105 is cut out at two portions thereof in a rectangular shape to form abutments 107b as swing stops for holding the grip body 1 in a horizontal attitude at its use position. A portion of the leg 105 between the two abutments 107b constitutes a pusher 107c which turns toward the opening side of the accommodating section 107 to push up a hereinafter described locking pin 123 in the opposite direction of its insertion into a through hole 117 described later. The structures described so far are common to the right- and left-hand legs 105. However, the hinge structures for mounting the grip body 1 for swing motion to the mounts 103A and 103B are slightly different between the right- and left-hand legs 105.

Specifically, in each of the right- and left-hand legs 105, two laterally opposed sidewalls 107d of the accommodating section 107 act as pin supports. The two sidewalls 107d of the left-hand leg 105 as viewed in FIG. 36 are provided with opposed support holes 107e as through holes, respectively, while the two sidewalls 107d of the right-hand leg 105 as viewed in FIG. 36 are formed with a through spacer fitting hole 107f of larger diameter and a bottomed support bore 107g of smaller diameter, respectively, so as to be opposed to each other.

As shown in FIG. 29, the left-hand mount 103A as viewed in FIG. 36 has a mount body 109 protruding toward the car room. The mount body 109 is formed in the shape of a rectangular box formed of a bottom wall 109a and sidewalls 109b. In the sidewalls 109b, a recess 109c open to the car room is formed. The lower end of the sidewall 109b forming one side (right-hand side in FIG. 29) of the mount body 109 is formed with an entrance 109d allowing for entry of the pusher 107c of the leg 105 therein. Side edges on both sides of the entrance 109d form stops 109e abuttable on the respective abutments 107b of the leg 105. On swinging the grip body 1 from retracted to use position, the abutments 107*b* abut on the stops 109*e* so that the grip body 1 is held against further swing motion and in a horizontal attitude at the use position (see FIG. 33).

As also shown in FIG. 35, two raised portions 109*f* of L-shape as viewed from above for preventing the locking pin from dropping down into the through hole 117 are juxtaposed in one end portion (left-hand portion as viewed in FIG. 29 or upper end portion as viewed in: FIG. 35) of the bottom wall 109*a*. Further, in a portion of the bottom wall 109*a* laterally away from the raised portions 109*f* (right-hand portion as viewed in FIG. 29 or lower portion as viewed in FIG. 35), another two raised portions 109*g* of substantially triangular as viewed from sidewise for preventing the locking pin from dropping down into the through hole 117 are juxtaposed in spaced relation to the raised portions 109*f*. The raised portions 109*g* located on the right side as viewed in FIG. 29 (the lower side as viewed in FIG. 35) are formed at side surfaces closer to the entrance 109*d* into inclined surfaces. The inclined surfaces act as a guide for smooth upward movement of a movement assist piece 127*a* described later of the locking pin 123 as shown in FIG. 29.

In the left-hand mount 103A as viewed in FIG. 36, a laterally protruding section formed of three sidewalls 109*b* above the entrance 109*d* constitutes a swing support section 111. The swing support section 111 consists of a pair of pin supports 111*a* and a connecting part 111*b* for connecting the pair of pin supports 111*a*. The pair of pin supports 111*a* are formed with pin receiving holes 111*c*, respectively. A pin 113 is inserted into the two pin receiving holes 111*c* and both ends of the pin 113 are inserted into the right and left support holes 107*e* of the leg 105. Thereby, the grip body 1 is supported for swing motion to the mount body 109. A torsion coil spring 115 is disposed on the pin 113. The torsion coil spring 115 is anchored at its one end to the connecting part 111*b* of the swing support section 111 and at the other end, through it is not shown, to the lower end of the leg 105. By the torque of the torsion coil spring 115, the grip body 1 is urged into swing motion from use to retracted position and the mount body 109 can be accommodated in the accommodating section 107 in the retracted position of the assist grip (see FIG. 29).

The recess 109*c* of the mount body 109 is divided into two sections by a partition 109*h*. The swing support section 111 is provided at one side (right side in FIG. 29 or lower side in FIG. 35) of the partition 109*h*. A portion of the bottom wall 109*a* located at the other side (left side in FIG. 29 or upper side in FIG. 35) of the partition 109*h* is formed with a rectangular through hole 117 passing between the raised portions 109*f* and 109*g* of the bottom wall 109*a* from front to back (from upper to lower side as viewed in FIG. 29). On the periphery of the through hole 117 on the back of the bottom wall 109*a* of the mount body 109, a pair of flexible engaging pieces 119 are oppositely extended which can be inserted into the mounting hole p1 of the inner panel P to engage on the edge of the mounting hole p1. Pawls 119*a* for preventing the drop-out of the mount body 109 from the inner panel P are formed at the respective distal ends of the flexible engaging pieces 119 so as to be protruded outwardly from the through hole 117. On the back of the pawl 119*a* of one (right-hand one in FIG. 29) of the flexible engaging pieces 119, a projection 119*b* is formed for retaining the locking pin 123 in its locking position. Further, on the back of the bottom wall 109*a* of the mount body 109, two abutment pieces 121 are extended beside the flexible engaging pieces 119. The abutment pieces 121 abut on the periphery of the mounting hole p1 of the inner panel P from the front side of the inner panel P when the assist grip is mounted to the inner panel P.

The two flexible engaging pieces 119 are pushed apart from each other by a resin-made locking pin 123. The locking pin 123 consists of a rod 125, a rectangular cap 127 integrally provided at the root end of the rod 125, and an extension 129 as a pin top integrally provided at the distal end of the rod 125. The extension 129 is formed with a locking retention notch 129*a* for seating the locking retention projection 119*b* of the pawl 119*a* of the flexible engaging piece 119 therein. Movement assist piece 127*a* is integrally extended from the cap 127 through a thinning portion 127*b*. The movement assist piece 127*a* is rockable with respect to the cap 127 through the thinning portion 127*b*. Before inserting the locking pin 123 into the through hole 117, the movement assist piece 127*a* is in parallel with the cap 127 (at its uppermost position) as shown in dash-single-dot lines in FIG. 30. In inserting the locking pin 123 into the through hole 117, the movement assist piece 127*a* lies along the partition 109*h* (at an intermediate position) as shown in dash-double-dot lines in FIG. 30 with the push thereof by the operator. Further, when the locking pin 123 is fully inserted into the through hole 117 to the extent that engages the bottom of the cap 127 to the raised portions 109*f*, 109*g* of the bottom wall 109*a*, the movement assist piece 127*a* is located between the raised portions 109*g* and the partition 109*h* as shown in solid lines in FIG. 30. In mounting the assist grip G to the inner panel P, the swing motion of the grip body 1 to the use position causes the pusher 107*c* to abut on the movement assist piece 127*a* and push the locking pin 123 in the opposite direction of the insertion into the through hole 117 as shown in FIG. 33.

Figure 30:
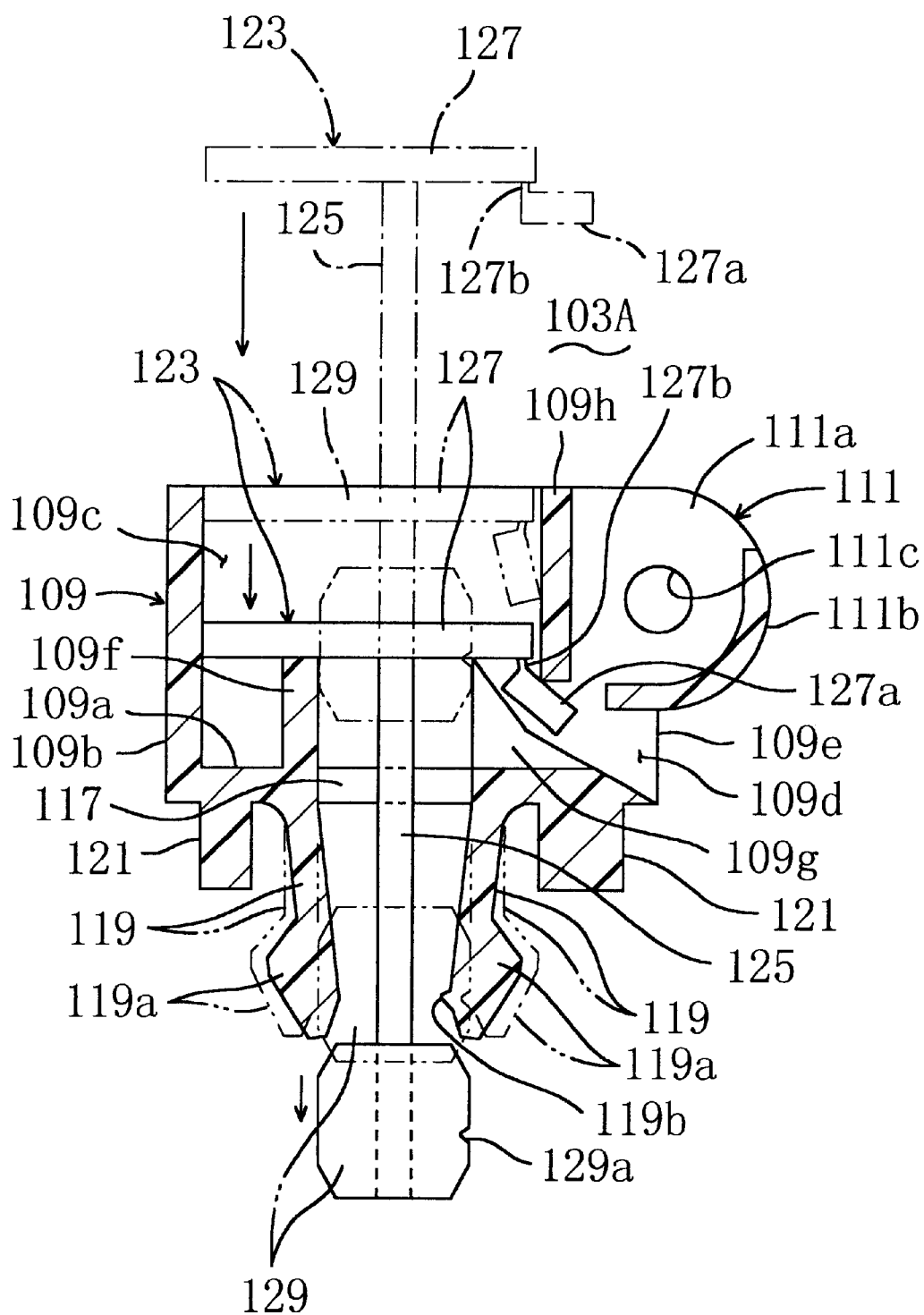
FIG. 30 is a longitudinal cross-sectional view showing that a locking pin is mounted to a mount body.

Before the mounts 103A, 103B are carried in the car body assembly line, the locking pin 123 is previously inserted into the through hole 117 of the mount body 109 against dropping out therefrom. Specifically, prior to the mounting of the grip body 1 to the mounts 103A and 103B, the locking pin 123 is inserted into the through hole 117 from the front side. During this insertion, the extension 129 at the distal end thereof passes between both the pawls 119*a* while pushing both the flexible engaging pieces 119 apart from each other. Then, when the extension 129 passes over the pawls 119*a*, the distance between the distal ends of the flexible engaging pieces 119 is narrowed. By the narrowed distance between the distal ends of the flexible engaging pieces 119, the extension 129 is restrained against movement in the opposite direction of the insertion into the through hole 117 and held at a position having passed over the locking retention projection 119*b* (outside of the pawls 119*a*) as shown in FIG. 30.

Further, in mounting the mount body 109 in which the locking pin 123 is inserted as described above, namely, the assist grip G of which the grip body 1 is mounted to the mounts 103A and 103B (see FIG. 31), to the inner panel P in the car body assembly line, the abutment pieces 121 of the mount body 109 are caused to abut on the respective peripheries of the mounting holes p1 of the inner panel P from the front side thereof, and in this state the grip body 1 is swung toward its use position. The pusher 107*c* of the leg 105 thereby pushes up the movement assist piece 127*a* so that the locking pin 123 is moved back in the opposite direction of the insertion into the through hole 117. Through this backward movement of the locking pin 123, the extension 129 goes back and enters between the flexible engaging pieces 119 while pushing them apart from each other, and the locking retention projection 119*b* of the pawl 119*a* then seats in the locking retention notch 129*a* of the extension 129. The extension 129 is thus retained at the locking position between the pawls 119a so that the locking pin 123 is held in locking condition with the flexible engaging pieces 119 held engaged on the edge of the mounting hole p1.

The right-hand mount 103B as viewed in FIG. 36 is different from the left-hand mount 103A in their hinge structures for mounting the grip body 1 for swing motion. However, the other structures are the same as in the left-hand mount 103A. Specifically, in the right-hand mount 103B, like Embodiment 1, the mount body 109 is provided with a bottomed cylindrical swing support section 131 for supporting the right-hand leg 105 as viewed in FIG. 36 for swing motion. The swing support section 131 includes a recess 131a diminishing its diameter toward the bottom (the left side as viewed in FIG. 36). A fulcrum pin 131b is extended outwardly from the bottom of the swing support section 131. A loose-fit pin 131c diminishing its diameter toward its distal end (to the right side in FIG. 36) is extended from the inner bottom of the recess 131a in coaxial relation with the fulcrum pin 131b. A spacer 133 diminishing its diameter toward its distal end (to the left side in FIG. 36) is inserted at its root end into a spacer fitting hole 107f of the right-hand leg 105. In the spacer 133, a pin loose-fitting part 133a diminishing its diameter toward its bottom (to the right side in FIG. 36) is formed from the distal to root end of the spacer 133. The spacer 133 is inserted into the recess 131a of the swing support section 131 with a space left therebetween. The loose-fit pin 131c of the swing support section 131 is inserted into the pin loose-fitting part 133a with a space left therebetween. These two spaces form a continuous single space. A viscidity (not shown) made of a high-viscosity liquid such as silicon is encapsulated in the continuous space, thereby forming a damper for producing torque acting as resistance against the swing motion of the grip body 1. By action of this damper, when swung from use to retracted position, the grip body 1 can return slowly to the retracted position against torque of the torsion coil spring 115.

Next, the mounting of the assist grip G to the inner panel P in this embodiment will be described with reference to FIGS. 30 through 33. First, the movement assist piece 127a of the cap 127 of the locking pin 123 is turned at the thinning portion 127b from the position shown in dash-single-dot lines in FIG. 30 to the position shown in dash-double-dot lines in FIG. 30 in the direction of insertion. In this condition, the locking pin 123 is inserted into the through hole 117 of the mount body 109 from the front side thereof and pushed thereinto until the back face of the cap 127 abuts on the raised portions 109f, 109g. During this insertion, since no restriction is present outside of the pair of flexible engaging pieces 119, the extension 129 at the distal end of the locking pin 123 passes between the pair of flexible engaging pieces 119 while pushing them apart from each other, passes over the pair of pawls 119a located at the locking position, and then moves outside beyond the distal ends of the pawls 119a (see solid lines in FIG. 30). In this case, though the locking retention projection 119b temporarily seats in the locking retention notch 129a of the extension 129, this seating engagement is released by a force of inserting the locking pin 123 and the locking pin 123 is further inserted. After the extension 129 has passed over the flexible engaging pieces 119, the flexible engaging pieces 119 pushed apart from each other are released from the pressing force of the extension 129 and regains its original position of narrow distance by its own restoring force. In this condition, the locking pin 123 is not only restrained against further movement in the direction of insertion since the back of the cap 127 abuts on the raised portions 109f and 109g, but also restrained against movement opposite to the direction of insertion since the extension 129 abuts on the distal ends of the pawls 119a. As a result, the extension 129 is retained outside of the distal ends of the pawls 119a.

In this manner, the locking pin 123 is held against drop-out from the through hole 117 of the mount body 109 and therefore can be prevented from being lost before the mounts 103A, 103B are carried in the car body assembly line. Accordingly, lack of parts and a difficult pulling work of the locking pin 123 falling into locking condition are eliminated. This avoids a serious impediment to a smooth flow of the car body assembly line.

During the insertion of the locking pin 123, the movement assist piece 127a moves guidedly along the partition 109h and is then presented between the partition 109h and the raised portions 109g.

Figure 31:
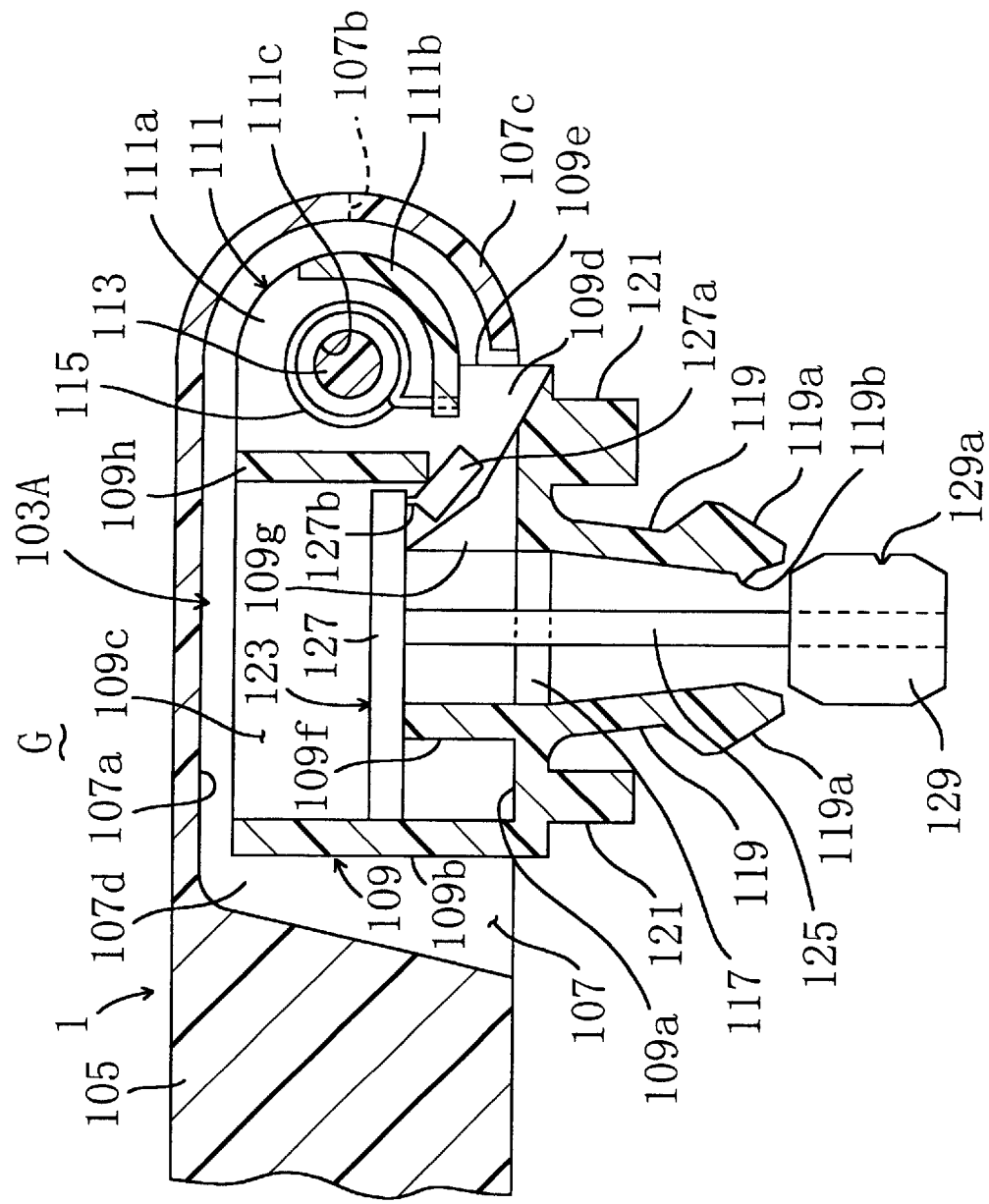
FIG. 31 is a longitudinal cross-sectional view showing that the locking pin and a grip body are mounted to a mount.

Next, the grip body 1 is mounted to the mounts 103A, 103B in which the locking pin 123 has been assembled in the mount body 109 in the above manner, thereby forming the assist grip G as shown in FIG. 31. Since the mount 103A shown in FIGS. 30 through 33 is the left-hand one shown in FIG. 36, the torsion coil spring 115 is disposed on the pin 113 of the swing support section 111 in FIG. 31. On the other hand, in the right-hand mount 103B as viewed in FIG. 36, the spacer 133 is inserted into the swing support section 131, thereby providing a damper function. In this condition, the grip body 1 takes a retracted position with respect to the mounts 103A, 103B by the torque of the torsion coil spring 115 (see FIG. 31).

Figure 32:
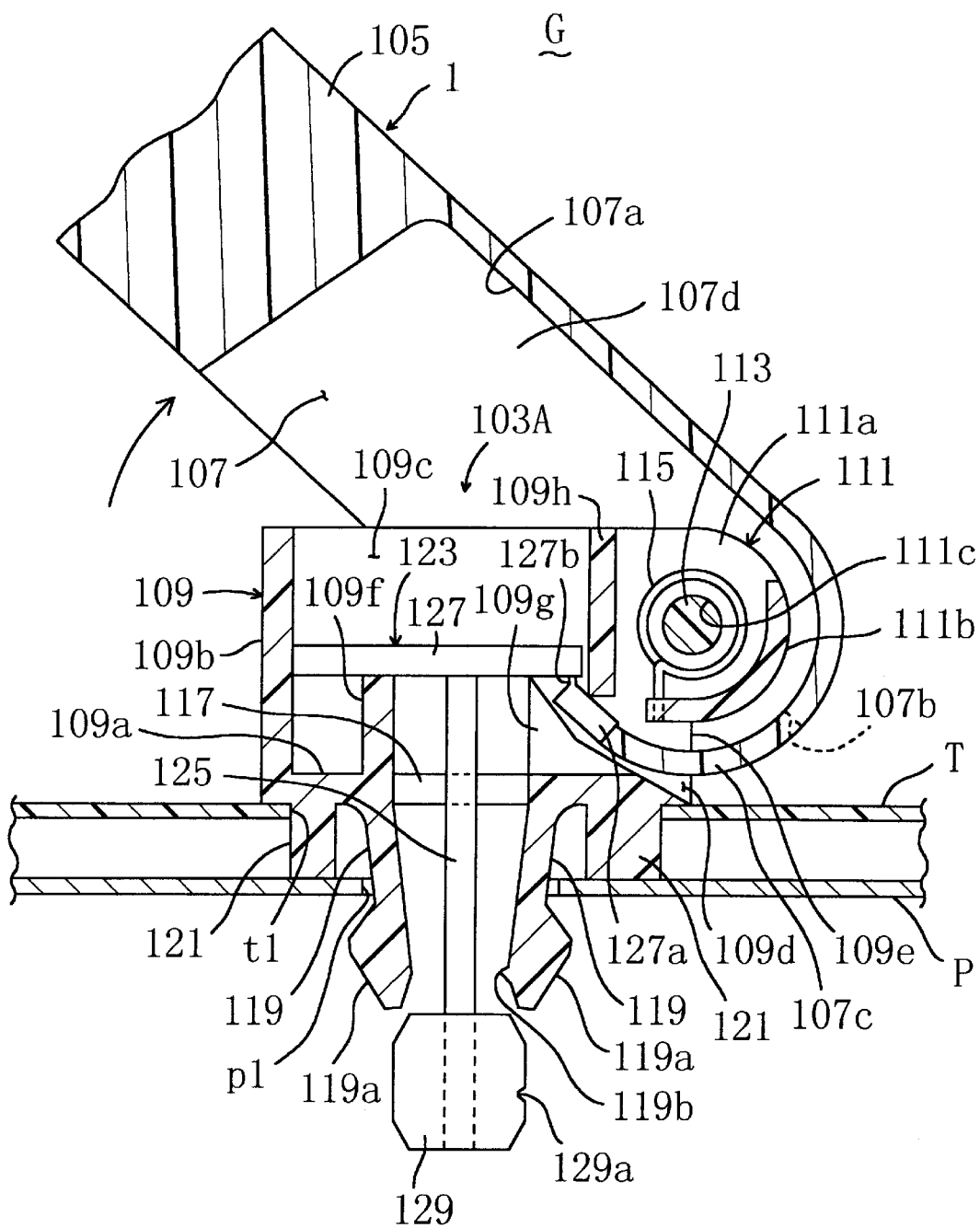
FIG. 32 is a longitudinal cross-sectional view showing an initial state of the grip body swung to its use position.

Thereafter, as shown in FIG. 32, the mounts 103A and 103B of the assist grip G are inserted into the corresponding mounting holes t1 of the ceiling member T to engage the abutment pieces 121 of the mount body 109 to the periphery of the corresponding mounting hole p1 of the inner panel P from the front side thereof, and concurrently the pawls 119a of the pair of flexible engaging pieces 119 are inserted into the mounting hole p1. During the time, since the extension 129 of the locking pin 123 has passed over the pawls 119a and is retained outside thereof, the flexible engaging pieces 119 are free from the pressing force of the extension 129. Further, since the distance between the pawls 119a is narrowed and the rod 125 of the locking pin 123 and the pawls 119a are set at dimensions capable of passing through the mounting hole p1 by the inward flexion of the pawls 119a, the pawls 119a c an be smoothly inserted into the mounting hole p1 of the inner panel P.

Thereafter, as shown in FIG. 33, the grip body 1 is swung to its use position. Through this swing motion, the pusher 107c of the leg 105 enters inside of the mount body 109 through the entrance 109d and moves the movement assist piece 127a of the locking pin 127 in the opposite direction of the insertion of the locking pin 127. During the time, the inclined surfaces of the raised portions 109g guides the movement assist piece 127a of the locking pin 123 for smooth movement and prevents separation of the pusher 107c from the movement assist piece 127a.

As a result, the locking pin 123 is moved back opposite to the direction of insertion. Through the backward movement of the locking pin 123, the extension 129 thereof enters between the flexible engaging pieces 119 and pushes them apart from each other, the locking retention projection 119b of the flexible engaging piece 119 seats in the locking retention notch 129a of the extension 129 to retain the extension 129 at the locking position between the pawls 119a, and the pawls 119a of the flexible engaging pieces 119 are held engaged on the edge of the mounting hole p1.

Then, when the grip body 1 is released, it returns to the retracted position as shown in FIG. 29 by the torque of the torsion coil spring 115 and the damping effect. From this point, even when the grip body 1 is swung again to the use position, the pusher 107c of the leg 105 no longer moves the movement assist piece 127a of the locking pin 123 in the opposite direction of the insertion of the locking pin 123. Accordingly, the locking pin 123 neither drops out nor interferes with the swing motion of the grip body 1.

As can be seen from the above, by simply swinging the grip body 1 to the use position, the extension 129 of the locking pin 123 can automatically be pushed up to the locking position (between the pawls 119a) to push the flexible engaging pieces 119 apart from each other and engage the flexible engaging pieces 119 on the edge of the mounting hole p1. Accordingly, the assist grip G can be easily mounted to the inner panel P in a single operation. In addition, in order to mount the assist grip G to the inner panel P, it suffices to prepare the grip body 1 and the mounts 103A and 103B with locking pins 123, which form the assist grip G, and other mounting jigs and parts are dispensed with. This presents cost reduction.

In Embodiment 6, engaging pieces for engaging the mount to the inner panel are implemented by the pair of flexible engaging pieces 119 having respective pawls 119a. Alternatively, one of the engaging pieces may be like flexible engaging piece 119 and the other engaging piece may be a fitting piece having a fitting groove. In this case, each of the mounts 103A, 103B in which the locking pin 123 has been inserted is inserted into the corresponding mounting hole t1 of the ceiling member T, the abutment piece 121 beside the pawl 119a is engaged to the periphery of the mounting hole p1 of the inner panel P from the front side thereof, the fitting groove of the fitting piece is fitted onto the edge of the mounting hole p1 of the inner panel P, and in this condition the grip body 1 is swung toward the use position. Thereby, the extension 129 of the locking pin 123 is pushed in between the fitting piece and the flexible engaging piece to engage the pawl 119a of the flexible engaging piece 119 to the periphery of the mounting hole p1 of the inner panel P from the back side thereof, thereby securing the inner panel P in sandwich relation between the end face of the abutment piece 121 and the pawl 119a and between the both side faces of the fitting groove of the fitting piece.

In Embodiment 6, the locking pin 123 is retained at its locking position (between the pawls 119a) by seating the locking retention projection 119b of the pawl 119a of the flexible engaging piece 119 in the locking retention notch 129a of the extension 129 of the locking pin 123. Alternatively, the locking pin 123 may be retained at its locking position (between the pawls 119a) by providing a retainer for retention of locking having an engaging projection in the cap 127 of the locking pin 123 and engaging the engaging projection of the retainer in an engaging window (locking retention window) formed in the sidewall 109b of the mount body 109.

In addition, a recess may be provided in one of abutting end faces of the movement assist piece 127a of the locking pin 123 and the pusher 107c of the leg 105 of the grip body 1, a corresponding projection may be provided in the other end face, both the recess and projection may be fitted with each other. In this case, during the movement of the locking pin 123 opposite in the direction of insertion, the pusher 107c can be prevented from disengaging from the movement assist piece 127a, thereby ensuring the movement of the locking pin 123 to the locking position.

In the above embodiments, the retractable assist grips for vehicles are described as examples. However, the present invention is also applicable to assist grips for other purposes.

What is claimed is:

1. A retractable assist grip comprising:

a pair of mounts fixed to a fixed body;

a grip body pivotally mounted for swing motion at legs thereof onto the mounts, respectively; and urging means, provided between at least one of the legs of the grip body and the corresponding mount, for urging the grip body into swing motion from its use position to its retracted position, wherein at least one of the pair of mounts includes a fulcrum pin extended integrally from one side thereof, a recess formed coaxially with the fulcrum pin on the opposite side of the mount, and a loose-fit pin extended integrally from the inner bottom toward the opening of the recess and coaxially with the fulcrum pin, the leg of the grip body, which corresponds to the mount comprising the fulcrum pin, the loose-fit pin and the recess, is formed with a pin support journaled on the fulcrum pin, the leg of the grip body, which corresponds to the mount comprising the fulcrum pin, the loose-fit pin and the recess, is assembled against relative rotation with a spacer rotatably inserted into the recess of the mount and including a pin loose-fitting part for loosely receiving the loose-fit pin therein, and a viscidity is provided in a space between the outer periphery of the spacer and the inner periphery of the recess of the mount.

2. The retractable assist grip of claim 1, wherein the viscidity is also provided in a space between the inner periphery of the pin loose-fitting part of the spacer and the outer periphery of the loose-fit pin of the mount.

3. The retractable assist grip of claim 1, wherein at least one of the pair of mounts comprises:

a mount body which is provided with a swing support section for supporting the legs of the grip body for swing motion and abuts on the periphery of a mounting hole of the fixed body from the front side of the fixed body;

a through hole passing through the mount body from front to back thereof;

at least two engaging pieces which are extended from the periphery of the through hole on the back of the mount body and inserted into the mounting hole of fixed body to engage on the edge of the mounting hole; and a locking pin having an extension at the distal end thereof, the locking pin being inserted into the through hole from the front side of the mount body prior to the mounting of the grip body to the mount so that the extension passes a locking position between the engaging pieces while pushing the engaging pieces apart from each other, the locking pin being restrained against movement opposite to a direction of insertion thereof into the through hole by the distal ends of the engaging pieces narrowed in distance therebetween by the passage of the extension over the locking position so that the extension is retained at a position having passed over the locking position, the locking pin being moved backward opposite to the direction of insertion thereof by the swing motion of the grip body to the use position in a state that the mount body of the mount to which the grip body is mounted is caused to abut on the periphery of the mounting hole of the fixed body from the front side thereof, the backward movement of the locking pin causing the extension to enter again between the engaging pieces and push the engaging pieces apart from each other so that the extension is retained at the locking position thereby holding the engaging pieces in engagement on the edge of the mounting hole.

4. The retractable assist grip of claim 3, wherein a movement assist piece is extended from the root end of the locking pin, and a pusher is provided at the bottom end of the leg of the grip body so as to abut on the movement assist piece and move the locking pin opposite to the direction of insertion thereof by the swing motion of the grip body to the use position.

5. The retractable assist grip of claim 1 or 2, wherein a sealing member is provided in either, one of a portion of inner periphery of the recess of the mount in the vicinity of the open end of the recess or a corresponding portion of the outer periphery of the spacer; and a sealing surface engaging against the sealing member is provided in the other, the engagement of the sealing member against the sealing surface from the outside at least the space between the outer periphery of the spacer and the inner periphery of the recess of the mount, the sealing member is placed, when the spacer is inserted into the recess of the mount and the viscidity is filled with at least the space between the outer periphery of the spacer and the inner periphery of the recess of the mount while expelling air from the space, to form a seal with the sealing surface by engagement against the sealing surface with the air in the space substantially fully expelled.

6. The retractable assist grip of claim 5, wherein the sealing member is placed, when the spacer is fully inserted into the recess of the mount, on a portion of the sealing surface closer to the opening of the recess than the center of the sealing surface in a direction of insertion of the sealing member.

7. The retractable assist grip of claim 1 or 2, wherein a first restriction part is extended on the outer periphery of the spacer so as to be opposed to and spaced a predetermined clearance apart from the inner periphery of the recess of the mount, a second restriction part is extended on the inner periphery of the recess of the mount so as to be opposed to and spaced a predetermined clearance apart from the outer periphery of the spacer, and the first and second restriction parts are placed at positions to allow the swing motion of the grip body between the use position and retracted position.

8. The retractable assist grip of claim 7, wherein a third restriction part is extended on the outer periphery of a loose-fit pin of the mount so as to be opposed to and spaced a predetermined clearance apart from the inner periphery of the pin loose-fitting part of the spacer, a fourth restriction part is extended on the inner periphery of the pin loose-fitting part of the spacer so as to be opposed to and spaced a predetermined clearance apart from the outer periphery of the loose-fit pin of the mount, and the third and fourth restriction parts are placed at positions to allow the swing motion of the grip body between the use and retracted positions.

9. The retractable assist grip of claim 1 or 2, wherein a plurality of support flanges are radially extended in circumferentially equally spaced relation on one of a bottom end portion of the inner periphery of the recess of the mount and the other periphery of a distal end of the spacer so as to relatively slidably engage the other.

10. A retractable assist grip comprising:

a pair of mounts fixed to a fixed body;

a grip body pivotally supported for swing motion at legs thereof onto the mounts, respectively; and urging means, provided between at least one of the legs of the grip body and the corresponding mount, for urging the grip body into swing motion from its use position to its retracted position, wherein at least one of the pair of mounts is formed of first and second mounts, a leg of the grip body is assembled into unitary rotation with a fulcrum pin supported to the first mount, the grip body is formed with a spacer fitting part formed of a concavity coaxial with the fulcrum pin, the fulcrum pin extending inside the spacer fitting part toward the opening. thereof, the second mount includes a spacer part rotatably fitted into the spacer fitting part and provided with a recess for loosely receiving the fulcrum pin extending inside the spacer fitting part therein, and a viscidity is provided at least between the outer periphery of the spacer part of the second mount and the inner periphery of the spacer fitting part of the grip body.

11. The retractable assist grip of claim 1, 2, or 10, wherein the fixed body is a car body panel.

12. A retractable assist grip comprising:

a pair of mounts fixed to a fixed body;

a grip body pivotally mounted for swing motion at legs thereof onto the mounts, respectively; and urging means, provided between at least one of the legs of the grip body and the corresponding mount, for urging the grip body into swing motion from its use position to its retracted position, wherein at least one of the pair of mounts includes a recess having a base and is formed on either face of the two sides of the fulcrum of the leg of the grip body, which corresponds to the mount comprising the recess, in a direction where the fulcrum lies, a loose-fit pin integrated to the inner bottom of the recess and is extended from the inner bottom toward the opening of the recess, a spacer including a pin loose-fitting part with a base for receiving the loose-fit pin and is rotatably inserted from a front part into the recess, the leg of the grip body, which corresponds to the mount comprising the loose-fit pin and the recess, is assembled against relative rotation at the base of the pin loose-fitting part, and a viscidity is provided in a space between the outer periphery of the spacer and the inner periphery of the recess of the mount.

13. The retractable assist grip of claim 12, wherein the viscidity is also provided in a space between the inner periphery of the pin loose-fitting part of the spacer and the outer periphery of the loose-fit pin of the mount.

14. The retractable assist grip of claim 12, wherein a sealing member is provided in either, one of a portion of inner periphery of the recess of the mount in the vicinity of the open end of the recess or a corresponding portion of the outer periphery of the spacer; and a sealing surface engaging against the sealing member is provided in the other, the engagement of the sealing member against the sealing surface from the outside at least the space between the outer periphery of the spacer and the inner periphery of the recess of the mount, the sealing member is placed, when the spacer is inserted into the recess of the mount and the viscidity is filled with at least the space between the outer periphery of the spacer and the inner periphery of the recess of the mount while expelling air from the space, to form a seal with the sealing surface by engagement against the sealing surface with the air in the space substantially fully expelled.

15. The retractable assist grip of claim 12, wherein a first restriction part is extended on the outer periphery of the spacer so as to be opposed to and spaced a predetermined clearance apart from the inner periphery of the recess of the mount, a second restriction part is extended on the inner periphery of the recess of the mount so as to be opposed to and spaced a predetermined clearance apart from the outer periphery of the spacer, and the first and second restriction parts are placed at positions to allow the swing motion of the grip body between the use position and retracted position.

16. The retractable assist grip of claim 15, wherein a third restriction part is extended on the outer periphery of a loose-fit pin of the mount so as to be opposed to and spaced a predetermined clearance apart from the inner periphery of the pin loose-fitting part of the spacer, a fourth restriction part is extended on the inner periphery of the pin loose-fitting part of the spacer so as to be opposed to and spaced a predetermined clearance apart from the outer periphery of the loose-fit pin of the mount, and the third and fourth restriction parts are placed at positions to allow the swing motion of the grip body between the use and retracted positions.

17. The retractable assist grip of claim 12, wherein a plurality of support flanges are radially extended in circumferentially equally spaced relation on one of a bottom end portion of the inner periphery of the recess on the mount and the other periphery of a distal end of the spacer so as to relatively engage the other.

18. The retractable assist grip of claim 12, wherein at least one of the pair of mounts comprises:

a mount body which is provided with a swing support section for supporting the legs of the grip body for swing motion and abuts on the periphery of a mounting hole of the fixed body from the front side of the fixed body;

a through hole passing through the mount body from front to back thereof;

at least two engaging pieces which are extended from the periphery of the through hole on the back of the mount body and inserted into the mounting hole of fixed body to engage on the edge of the mounting hole; and a locking pin having an extension at the distal end thereof, the locking pin being inserted into the through hole from the front side of the mount body prior to the mounting of the grip body to the mount so that the extension passes a locking position between the engaging pieces while pushing the engaging pieces apart from each other, the locking pin being restrained against movement opposite to a direction of insertion thereof into the through hole by the distal ends of the engaging pieces narrowed in distance therebetween by the passage of the extension over the locking position so that the extension is retained at a position having passed over the locking position, the locking pin being moved backward opposite to the direction of insertion thereof by the swing motion of the grip body to the use position in a state that the mount body of the mount to which the grip body is mounted is caused to abut on the periphery of the mounting hole of the fixed body from the front side thereof, the backward movement of the locking pin causing the extension to enter again between the engaging pieces and push the engaging pieces apart from each other so that the extension is retained at the locking position thereby holding the engaging pieces in engagement on the edge of the mounting hole.

19. The retractble assist grip of claim 12, wherein the fixed body is a car body panel.

* * * * *

UNITED STATES PATENT AND TRADEMARK OFFICE
CERTIFICATE OF CORRECTION

PATENT NO.     : 6,405,410 B1
DATED          : June 18, 2002
INVENTOR(S)    : Sugumune Miho et al.

It is certified that error appears in the above-identified patent and that said Letters Patent is hereby corrected as shown below:

<u>Title page,</u>
Item [56], References Cited, U.S. PATENT DOCUMENTS, insert
-- 4,981,322 Dowd et al. 01/01/1991--.

Signed and Sealed this

Eleventh Day of February, 2003

JAMES E. ROGAN
*Director of the United States Patent and Trademark Office*